(12) United States Patent
Xie

(10) Patent No.: US 12,535,457 B2
(45) Date of Patent: Jan. 27, 2026

(54) SOLID STATE NANOPORE FORMATION

(71) Applicant: Oxford Nanopore Technologies PLC, Oxford (GB)

(72) Inventor: Ping Xie, Oxford (GB)

(73) Assignee: Oxford Nanopore Technologies PLC, Oxford (GB)

(*) Notice: Subject to any disclaimer, the term of this patent is extended or adjusted under 35 U.S.C. 154(b) by 324 days.

(21) Appl. No.: 18/017,119

(22) PCT Filed: Jul. 21, 2021

(86) PCT No.: PCT/US2021/042562
§ 371 (c)(1),
(2) Date: Jan. 20, 2023

(87) PCT Pub. No.: WO2022/020461
PCT Pub. Date: Jan. 27, 2022

(65) Prior Publication Data
US 2023/0266268 A1 Aug. 24, 2023

Related U.S. Application Data

(60) Provisional application No. 63/055,126, filed on Jul. 22, 2020.

(51) Int. Cl.
*G01N 27/414* (2006.01)
*B01L 3/00* (2006.01)
(Continued)

(52) U.S. Cl.
CPC .... *G01N 27/4146* (2013.01); *B01L 3/502761* (2013.01); *G01N 27/4145* (2013.01);
(Continued)

(58) Field of Classification Search
None
See application file for complete search history.

(56) References Cited

U.S. PATENT DOCUMENTS

| 6,627,067 B1 | 9/2003 | Branton et al. |
| 8,698,481 B2 | 4/2014 | Lieber et al. |

(Continued)

FOREIGN PATENT DOCUMENTS

| WO | WO 2000/028312 A1 | 5/2000 |
| WO | WO 2005/124888 A1 | 12/2005 |

(Continued)

OTHER PUBLICATIONS

International Search Report and Written Opinion for Application No. PCT/US2021/042562, mailed Oct. 20, 2021.
(Continued)

*Primary Examiner* — J. Christopher Ball
(74) *Attorney, Agent, or Firm* — Wolf, Greenfield & Sacks, P.C.

(57) ABSTRACT

The invention relates to a process for producing a substrate comprising an aperture, which process comprises providing a substrate which comprises a solid-state membrane and a chemical surface modification on a first surface of the solid-state membrane; and forming an aperture through the chemical surface modification and the solid-state membrane. The invention also relates to a substrate comprising a chemical surface membrane and an aperture, a sensor comprising such a substrate and an apparatus comprising such a substrate.

21 Claims, 5 Drawing Sheets

(51) Int. Cl.
  *B82Y 15/00* (2011.01)
  *B82Y 40/00* (2011.01)
(52) U.S. Cl.
  CPC ............. *B01L 2200/0647* (2013.01); *B01L 2300/0645* (2013.01); *B01L 2300/165* (2013.01); *B82Y 15/00* (2013.01); *B82Y 40/00* (2013.01)

(56) References Cited

U.S. PATENT DOCUMENTS

| | | | |
|---|---|---|---|
| 8,828,138 | B2 | 9/2014 | Bedell et al. |
| 8,828,211 | B2 | 9/2014 | Garaj et al. |
| 2011/0053284 | A1 | 3/2011 | Meller et al. |
| 2013/0309776 | A1 | 11/2013 | Drndic et al. |
| 2014/0174927 | A1 | 6/2014 | Bashir et al. |
| 2018/0141007 | A1 | 5/2018 | Xie et al. |
| 2020/0088713 | A1 | 3/2020 | Durand et al. |
| 2020/0103392 | A1* | 4/2020 | Wilner ............. G01N 33/48721 |

FOREIGN PATENT DOCUMENTS

| | | |
|---|---|---|
| WO | WO 2007/041621 A2 | 4/2007 |
| WO | WO 2008/102120 A1 | 8/2008 |
| WO | WO 2008/124107 A1 | 10/2008 |
| WO | WO 2009/020682 A2 | 2/2009 |
| WO | WO 2009/035647 A1 | 3/2009 |
| WO | WO 2009/077734 A2 | 6/2009 |
| WO | WO 2010/122293 A1 | 10/2010 |
| WO | WO 2011/040996 A1 | 4/2011 |
| WO | WO 2011/067559 A1 | 6/2011 |
| WO | WO 2011/130312 A1 | 10/2011 |
| WO | WO 2012/005857 A1 | 1/2012 |
| WO | WO 2012/107778 A2 | 8/2012 |
| WO | WO 2013/057495 A2 | 4/2013 |
| WO | WO 2013/083983 A1 | 6/2013 |
| WO | WO 2013/098561 A1 | 7/2013 |
| WO | WO 2013/098562 A2 | 7/2013 |
| WO | WO 2013/123379 A2 | 8/2013 |
| WO | WO 2013/153359 A1 | 10/2013 |
| WO | WO 2014/064443 A2 | 5/2014 |
| WO | WO 2014/064444 A1 | 5/2014 |
| WO | WO 2014/122654 A2 | 8/2014 |
| WO | WO 2016/034591 A2 | 3/2016 |
| WO | WO 2016/187519 A1 | 11/2016 |
| WO | WO 2018/011603 A1 | 1/2018 |
| WO | WO 2018/096348 A1 | 5/2018 |
| WO | WO 2019/002893 A1 | 1/2019 |

OTHER PUBLICATIONS

International Preliminary Report on Patentability for Application No. PCT/US2021/042562, mailed Feb. 2, 2023.
Bell et al., DNA origami nanopores. Nano Lett. Jan. 11, 2012;12(1):512-7. doi: 10.1021/nl204098n. Epub Dec. 29, 2011.
Cai et al., Formation of MspA channel on Nanopore-Spanning Lipid Bilayer. ACMME InIOP Conference Series: Materials Science and Engineering, Jul. 1, 2018;394(2):022067. doi:10.1088/1757-899X/394/2/022067.
Dy Bandara et al., Beyond nanopore sizing: improving solid-state single-molecule sensing performance, lifetime, and analyte scope for omics by targeting surface chemistry during fabrication. Nanotechnology. Aug. 14, 2020;31(33):335707. doi: 10.1088/1361-6528/ab8f4d. Epub May 1, 2020.
Gonzalez-Perez et al., Biomimetic triblock copolymer membrane arrays: a stable template for functional membrane proteins. Langmuir. Sep. 15, 2009;25(18):10447-50. doi: 10.1021/la902417m.
Goto et al., Integrated solid-state nanopore platform for nanopore fabrication via dielectric breakdown, DNA-speed deceleration and noise reduction. Sci Rep. Aug. 8, 2016;6:31324. doi: 10.1038/srep31324.
Goto et al., Silicon nitride nanopore created by dielectric breakdown with a divalent cation: deceleration of translocation speed and identification of single nucleotides. Nanoscale. Aug. 1, 2019;11(30):14426-14433. doi: 10.1039/c9nr03563j.
Hall et al., Hybrid pore formation by directed insertion of α-haemolysin into solid-state nanopores. Nat Nanotechnol. Dec. 2010;5(12):874-7. doi: 10.1038/nnano.2010.237. Epub Nov. 28, 2010.
Hernandez-Ainsa et al., DNA origami nanopores: developments, challenges and perspectives. Nanoscale. Nov. 6, 2014;6(23):14121-32. doi: 10.1039/c4nr04094e.
Hernandez-Ainsa et al., Lipid-coated nanocapillaries for DNA sensing. Analyst. Jan. 7, 2013;138(1):104-6. doi: 10.1039/c2an36397f. Epub Nov. 13, 2012.
Ivanov et al., DNA tunneling detector embedded in a nanopore. Nano Lett. Jan. 12, 2011;11(1):279-85. doi: 10.1021/nl103873a. Epub Dec. 6, 2010.
Korman et al., Nanopore-spanning lipid bilayers on silicon nitride membranes that seal and selectively transport ions. Langmuir. Apr. 9, 2013;29(14):4421-5. doi: 10.1021/la305064j. Epub Mar. 25, 2013.
Kwok et al., Nanopore fabrication by controlled dielectric breakdown. PLoS One. Mar. 21, 2014;9(3):e92880. doi: 10.1371/journal.pone.0092880.
Langecker et al., Synthetic lipid membrane channels formed by designed DNA nanostructures. Science. Nov. 16, 2012;338(6109):932-6. doi: 10.1126/science.1225624.
Lieberman et al., Processive replication of single DNA molecules in a nanopore catalyzed by phi29 DNA polymerase. J Am Chem Soc. Dec. 22, 2010;132(50):17961-72. doi: 10.1021/ja1087612. Epub Dec. 1, 2010. Author Manuscript, 21 pages.
Montal et al., Formation of bimolecular membranes from lipid monolayers and a study of their electrical properties. Proc Natl Acad Sci U S A. Dec. 1972;69(12):3561-6. doi: 10.1073/pnas.69.12.3561.
Perez-Mitta et al., Noncovalent functionalization of solid-state nanopores via self-assembly of amphipols. Nanoscale. Jan. 21, 2016;8(3):1470-8. doi: 10.1039/c5nr08190d.
Soni et al., Synchronous optical and electrical detection of biomolecules traversing through solid-state nanopores. Rev Sci Instrum. Jan. 2010;81(1):014301. doi: 10.1063/1.3277116.
Stoddart et al., Single-nucleotide discrimination in immobilized DNA oligonucleotides with a biological nanopore. Proc Natl Acad Sci U S A. May 12, 2009;106(19):7702-7. doi: 10.1073/pnas.0901054106. Epub Apr. 20, 2009.
Wanunu et al., Chemically modified solid-state nanopores. Nano Lett. Jun. 2007;7(6):1580-5. doi: 10.1021/nl070462b. Epub May 16, 2007.
Waugh et al., Interfacing solid-state nanopores with gel media to slow DNA translocations. Electrophoresis. Aug. 2015;36(15):1759-67. doi: 10.1002/elps.201400488. Epub Jun. 3, 2015.
Wei et al., DNA origami gatekeepers for solid-state nanopores. Angew Chem Int Ed Engl. May 14, 2012;51(20):4864-7. doi: 10.1002/anie.201200688. Epub Apr. 4, 2012.
White et al., Single ion-channel recordings using glass nanopore membranes. J Am Chem Soc. Sep. 26, 2007;129(38):11766-75. doi: 10.1021/ja073174q. Epub Sep. 5, 2007.
Xie et al., Local electrical potential detection of DNA by nanowire-nanopore sensors. Nat Nanotechnol. Dec. 11, 2011;7(2):119-25. doi: 10.1038/nnano.2011.217. Author Manuscript, 15 pages.
Yusko et al., Controlling protein translocation through nanopores with bio-inspired fluid walls. Nat Nanotechnol. Apr. 2011;6(4):253-60. doi: 10.1038/nnano.2011.12. Epub Feb. 20, 2011.

* cited by examiner

SOLID STATE NANOPORE FORMATION

RELATED APPLICATION

This Application is a national stage filing under 35 U.S.C. 371 of International application number PCT/US2021/042562, filed Jul. 21, 2021, which claims priority under 35 U.S.C. § 119(e) to U.S. Provisional application No. 63/055,126, filed Jul. 22, 2020, each of which is herein incorporated by reference in its entirety.

FIELD OF THE INVENTION

The present invention concerns a process for producing an aperture in a substrate which comprises a solid-state membrane and a chemical surface modification on its surface. Also provided is a substrate comprising an aperture, which can be obtained by the process of the invention. In particular, the invention provides a substrate having a chemical surface modification and (i) comprising an aperture which is less than 5 nm in diameter, or (ii) comprising an aperture up to 50 nm in diameter and having a layer of amphipathic molecules disposed across the aperture. The invention further provides a sensor comprising a substrate as described herein, and a method of characterising a polymer using such a sensor.

BACKGROUND TO THE INVENTION

Nano-sized pores are useful in a wide variety of devices where operations at the nanoscale are required. One important application is in localising, detecting and or characterising polymers, for example polynucleotides or polypeptides. Polymers can be detected or characterized by observation of individual binding or interaction events between the analyte molecules and a nano-sized pore capable of conducting ions. For instance, ion currents through the pore can be measured in the presence of the polymer. The presence of a polymer species at or near the pore will alter the flow of ions through the pore, resulting in altered ionic or electric currents being measured across the pore. The identity of the polymer can be revealed through its distinctive current signature, notably the duration and extent of current blocks and the variance of current levels during its interaction time with the pore.

Nano-sized pores can be created from inorganic and/or organic materials. Biomolecular pores are biomolecules arranged to provide a channel therethrough; examples include protein nanopores, formed by one or more proteins which adopt a three-dimensional shape comprising a channel. Another type of pore is the solid-state nanopore, which includes a solid-state membrane having an aperture therethrough. Solid-state nanopores are particularly useful in the manufacture of industrial devices as they have the potential to offer excellent durability, good control of pore size and shape, and are suitable for insertion into wafer-type devices.

Where a solid-state membrane is used to generate a nanopore, it is often desirable to modify the surface of the solid-state membrane to optimise its properties for subsequent use. For example, it may be desirable to provide a protective or biologically-compatible coating to the solid-state membrane to make it compatible with biological systems. In particular, it may be desirable to modify the hydrophobicity, chemical specificity, chemical reactivity or surface charge of the solid-state membrane. This can be done by applying a chemical surface modification to the solid-state membrane. However, known methods cannot provide the full range of desired aperture sizes in combination with a chemical surface modification.

Typical methods of generating an aperture in a solid-state membrane include use of a focussed ion beam, ion beam sculpting and transmission electron microscopy. These are high-energy, aggressive processes which destroy chemical surface modifications on the surface of the solid-state membrane in the area surrounding the generated aperture. Thus, previous workers have concluded that apertures must be generated in the solid-state membrane before any chemical surface modification is applied.

Although a chemical surface modification can be applied after aperture generation, this process is disadvantageous where small apertures are present in the solid-state membrane. Application of a chemical surface modification to solid-state membranes comprising small pores, typically less than 10 nm in diameter, tends to clog the pores (Wanunu & Meller, Nano Letters (2007), Vol. 7, No. 6, pp 1580-1585). Consequently, there remains a need for a method of generating a solid-state membrane comprising a chemical surface modification and an aperture, particularly a small aperture.

It would be desirable to provide a solid-state membrane comprising a chemical surface modification and an aperture of any size, particularly a small aperture. In particular, it would be highly desirable to provide a solid-state membrane comprising a chemical modification and a small aperture having a lipid bilayer disposed across the aperture. This would be particularly useful in the context of ion-channel measurements. Experiments have been performed showing that biomolecular pores (such as alpha-hemolysin) can be inserted into an aperture in a solid-state membrane, thus forming a "hybrid nanopore" comprising a solid-state membrane, an aperture and a biomolecular pore. However, ion channel measurements performed across the solid state membrane are unreliable due to leakage of current through the aperture around the body of the biomolecular pore (Hall et al., Nature Nanotechnology (2010), Vol. 5, pp 874-8T7). Inclusion of a lipid bilayer disposed across the aperture would form a seal preventing charge transfer across the solid-state membrane. However, the surface of a typical solid-state membrane must be modified in order to be able to support a lipid bilayer. Moreover, a lipid bilayer spanning a large-diameter aperture is susceptible to pressure fluctuations, mechanical vibrations, and electrical disturbances and is therefore highly susceptible to failure shortly after formation (White et al., J. Am. Chem. Soc. (2007), vol. 129, pp 11766-11775).

A chemical surface modification which promotes the ability of the solid-state membrane to support a lipid bilayer can be applied to a solid-state membrane once an aperture is formed in the solid-state membrane. However, where the aperture is large, the chemical surface modification can be deposited on the internal walls of the aperture and can encourage the lipid bilayer to line the internal walls of the aperture rather than spanning the aperture and forming the desired charge seal. Further, where the aperture is small, subsequent addition of a chemical surface modification can cause clogging of the pore (as discussed above).

The present invention aims to provide a versatile process for producing a substrate comprising an aperture and a chemical surface modification which overcomes the above difficulties. The invention also aims to provide a substrate which cannot be provided by the art, comprising a solid state membrane having a surface modification and an aperture, particularly a small aperture.

SUMMARY OF THE INVENTION

The inventors have found that alternative methods of forming an aperture in a solid-state membrane can be applied to a solid-state membrane after a chemical surface modification has been applied to the solid state membrane, without destroying the chemical surface modification. Thus, according to an embodiment of the invention there is provided a process for producing a substrate comprising an aperture, which process comprises providing a substrate which comprises a solid-state membrane and a chemical surface modification on a first surface of the solid-state membrane; and forming an aperture through the chemical surface modification and the solid-state membrane.

A suitable method for generating an aperture in a solid-state membrane is the dielectric breakdown method. Thus, in an aspect of the process of the invention, the step of forming an aperture through the chemical surface modification and the solid-state membrane comprises causing dielectric breakdown of the solid-state membrane. This has been shown by the inventors to gradually open the aperture in a controllable fashion while preserving the chemical surface modification nearby.

A particular advantage of the process of the invention is that, because a less aggressive method of forming an aperture is used, generation of an aperture can be performed in the presence of a precursor which can modify the surface of the solid-state membrane. The inventors have surprisingly found that, rather than clogging the aperture (even if the aperture is very small, of the order of 5 nm or less), the chemical surface modification precursor can immediately attach to the internal wall of the aperture. Without wishing to be bound by theory, it is speculated that the ability of the chemical surface modification precursor to readily attach to the aperture wall rather than simply clogging the pore may be connected with the fact that the a "fresh surface" is exposed by generation of the aperture. The fresh surface of the solid-state membrane generated with the aperture has not been exposed to the environment and modified (by oxidation, for instance). Thus, the internal wall of the aperture may react particularly readily when immediately exposed to the chemical surface modification precursor.

It is highly desirable to provide a chemical surface modification on the internal wall of an aperture, even where the aperture is small, for example to passivate the pore and thus prevent clogging if the pore is subsequently exposed to biomolecules.

Thus, in an aspect, the process of the invention comprises allowing a chemical surface modification to form immediately on a wall of the aperture, e.g. on the internal wall of the aperture. For instance, in the process of the invention, the chemical surface modification on a first surface of the solid-state membrane contacts a first ionic solution;

a second surface of the solid-state membrane, or a chemical surface modification on the second surface of the solid-state membrane, contacts a second ionic solution; and the first ionic solution and/or the second ionic solution comprises a chemical surface modification precursor; and the process comprises allowing a chemical surface modification to form immediately on the internal wall of the aperture.

In another aspect, the process may comprise producing a hybrid nanopore. A hybrid nanopore comprises a solid-state membrane, an aperture, and a biomolecular pore. Typically, the biomolecular pore is situated at least partly within the aperture. Because the process of the invention can generate very small apertures, the aperture may be small enough that the aperture can accommodate only one biomolecular pore. Steric effects can prevent a second or further biomolecular pore from inserting wholly or partly into the aperture, as the aperture may be, in effect, sterically blocked by the first nanopore. The ability to provide a hybrid nanopore comprising no more than one biomolecular pore is most useful in detecting and or characterising polymers. This is because any measurements taken across the solid-state membrane as the polymer interacts with the transmembrane pore must originate solely from the interaction of a polymer with a single biomolecular pore.

Accordingly, in an aspect, the process of the invention comprises inserting no more than one biomolecular pore into the aperture.

The process of the invention can produce a substrate comprising a solid state membrane and an aperture, which is useful as a solid-state nanopore which can be utilised in a wide variety of devices where operations at the nanoscale are required. Thus, in another embodiment, the invention provides a substrate comprising an aperture which is obtained or obtainable by a process as described herein.

The inventors have produced a substrate comprising an aperture and a solid-state membrane with a chemical surface modification thereon. The chemical surface modification can modify the solid-state membrane so as to allow the substrate to support a layer of amphipathic molecules spanning the aperture. The layer of amphipathic molecules, for instance a lipid bilayer, is useful in that it can prevent free flow of liquid from one side of the solid-state membrane to the other, and can, in some aspects, support a biomolecular pore. In particular, the aperture may be small so as to improve stability of the layer of amphipathic molecules and, where a biomolecular pore is present, to reduce the likelihood of multiple biomolecular pores being present in the layer of amphipathic molecules. Thus, in an embodiment the invention provides a substrate comprising an aperture, wherein the substrate comprises a solid state membrane and a chemical surface modification on a first surface of the solid state membrane;

the aperture is up to 50 nm in diameter; and a layer of amphipathic molecules is disposed across the aperture The inventors have newly been able to provide, using a process as exemplified herein, a solid-state membrane having a chemical surface modification and an exceedingly small aperture, without clogging the aperture. Substrates having a chemical surface modification and a small aperture are of great potential use in devices where nano-scale operations are required, as discussed above. Thus, in a further aspect, the invention provides a substrate comprising an aperture, wherein the substrate comprises a solid state membrane and a chemical surface modification on a first surface of the solid state membrane; and the aperture is less than 5 nm in diameter.

The substrate of the invention is particularly useful in localising, detecting and or characterising polymers, for example polynucleotides or polypeptides. This may be achieved by incorporating a substrate as described herein into a sensor. The sensor, or a sensing system comprising the sensor, may be configured to perform one or more measurements as a polymer moves with respect to the aperture, which measurements are indicative of one or more characteristics of the polymer. For instance, the sensor may be configured to detect the flow of current across the substrate.

Accordingly, the invention provides a sensor comprising a substrate as described herein. Further, the invention provides a method of characterising a target polymer using said sensor, the method comprising contacting the sensor with the target polymer, such that the target polymer moves with respect to, for example into or through, the aperture or one of the apertures in the substrate; and taking one or more measurements as the target polymer moves with respect to the aperture and thereby characterising the target polymer; optionally wherein the method comprises measuring the current passing through the aperture as the target polymer moves with respect to the aperture.

The invention further provides an apparatus comprising a substrate as described herein. In a particular example, the invention provides an apparatus comprising a sensor as described herein.

The above embodiments of the invention are described in more detail below.

BRIEF DESCRIPTION OF THE FIGURES

In FIG. 3, the first surface of the left-hand recess carries a first chemical surface modification. However, the other surfaces do not have a chemical surface modification thereon.

DETAILED DESCRIPTION OF THE INVENTION

Figure 1:
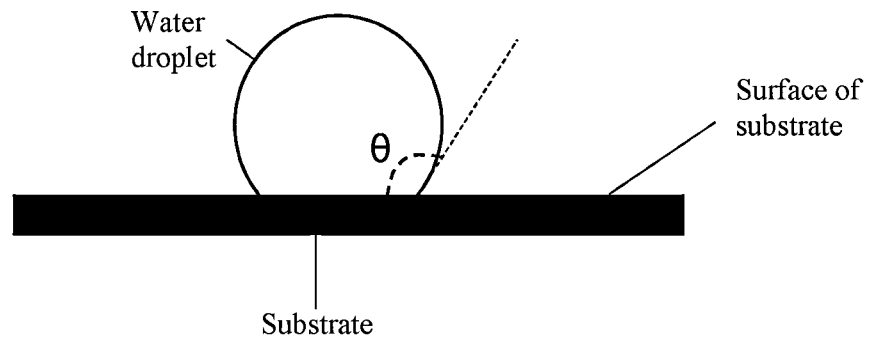
FIG. 1 demonstrates what is meant by the "contact angle" of a water droplet with a surface of a substrate. The contact angle, θ, is marked.

Unless defined otherwise, all technical and scientific terms used herein have the same meanings as commonly understood by one of skill in the art to which the disclosed invention belongs. Publications cited herein and the materials for which they are cited are specifically incorporated by reference.

The present invention will be described with respect to particular embodiments and with reference to certain drawings but the invention is not limited thereto but only by the claims. Any reference signs in the claims shall not be construed as limiting the scope. Of course, it is to be understood that not necessarily all aspects or advantages may be achieved in accordance with any particular embodiment of the invention. Thus, for example those skilled in the art will recognize that the invention may be embodied or carried out in a manner that achieves or optimizes one advantage or group of advantages as taught herein without necessarily achieving other aspects or advantages as may be taught or suggested herein.

The invention, both as to organization and method of operation, together with features and advantages thereof, may best be understood by reference to the following detailed description when read in conjunction with the accompanying drawings. The aspects and advantages of the invention will be apparent from and elucidated with reference to the embodiment(s) described hereinafter. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

It should be appreciated that "embodiments" of the disclosure can be specifically combined together unless the context indicates otherwise. The specific combinations of all disclosed embodiments (unless implied otherwise by the context) are further disclosed embodiments of the claimed invention.

It should also be noted that the following discussion concerns embodiments of the invention, relating to: a process; a substrate obtainable by that process; a substrate comprising a layer of amphipathic molecules; and a substrate comprising an aperture less than 5 nm in diameter. Except where otherwise stated, discussion of an aspect of each embodiment of the invention also relates to that aspect in any other embodiment of the invention. For instance, discussion hereafter of "the substrate" or a "solid-state membrane" concerns the substrate or solid-state membrane utilised in the process of the invention but also comprised in the various products of the invention.

Those skilled in the art will recognize, or be able to ascertain using no more than routine experimentation, many equivalents to the specific embodiments of the invention described herein. Such equivalents are intended to be encompassed by the following claims.

Definitions

As used in this specification and the appended claims, the singular forms "a", "an", and "the" include plural referents unless the content clearly dictates otherwise. Thus, for example, reference to "an aperture" includes two or more apertures.

Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Polynucleotide", "Nucleotide sequence", "DNA sequence" or "nucleic acid molecule(s)" as used herein refers to a polymeric form of nucleotides of any length, either ribonucleotides or deoxyribonucleotides. This term refers only to the primary structure of the molecule. Thus, this term includes double- and single-stranded DNA, and RNA. The term "nucleic acid" as used herein, is a single or double stranded covalently-linked sequence of nucleotides in which the 3' and 5' ends on each nucleotide are joined by phosphodiester bonds. The polynucleotide may be made up of deoxyribonucleotide bases or ribonucleotide bases. Nucleic acids may be manufactured synthetically in vitro or isolated from natural sources. Nucleic acids may further include modified DNA or RNA, for example DNA or RNA that has been methylated, or RNA that has been subject to post-translational modification, for example 5'-capping with 7-methylguanosine, 3'-processing such as cleavage and polyadenylation, and splicing. Nucleic acids may also include synthetic nucleic acids (XNA), such as hexitol nucleic acid (HNA), cyclohexene nucleic acid (CeNA), threose nucleic acid (TNA), glycerol nucleic acid (GNA), locked nucleic acid (LNA) and peptide nucleic acid (PNA). Sizes of nucleic acids, also referred to herein as "polynucleotides" are typically expressed as the number of base pairs (bp) for double stranded polynucleotides, or in the case of single stranded polynucleotides as the number of nucleotides (nt). One thousand bp or nt equal a kilobase (kb). Polynucleotides of less than around 40 nucleotides in length are typically called "oligonucleotides" and may comprise primers for use in manipulation of DNA such as via polymerase chain reaction (PCR).

The term "amino acid" in the context of the present disclosure is used in its broadest sense and is meant to include organic compounds containing amine ($NH_2$) and carboxyl (COOH) functional groups, along with a side chain (e.g., a R group) specific to each amino acid. In some embodiments, the amino acids refer to naturally occurring L α-amino acids or residues. The commonly used one and three letter abbreviations for naturally occurring amino acids are used herein: A=Ala; C=Cys; D=Asp; E=Glu; F=Phe; G=Gly; H=His; I=Ile; K=Lys; L=Leu; M=Met; N=Asn; P=Pro; Q=Gln; R=Arg; S=Ser; T=Thr; V=Val; W=Trp; and Y=Tyr (Lehninger, A. L., (1975) Biochemistry, 2d ed., pp. 71-92, Worth Publishers, New York). The general term "amino acid" further includes D-amino acids, retro-inverso amino acids as well as chemically modified amino acids such as amino acid analogues, naturally occurring amino acids that are not usually incorporated into proteins such as norleucine, and chemically synthesised compounds having properties known in the art to be characteristic of an amino acid, such as β-amino acids. For example, analogues or mimetics of phenylalanine or proline, which allow the same conformational restriction of the peptide compounds as do natural Phe or Pro, are included within the definition of amino acid. Such analogues and mimetics are referred to herein as "functional equivalents" of the respective amino acid. Other examples of amino acids are listed by Roberts and Vellaccio, The Peptides: Analysis, Synthesis, Biology, Gross and Meiehofer, eds., Vol. 5 p. 341, Academic Press, Inc., N.Y. 1983, which is incorporated herein by reference.

Standard substitution notation is also used in relation to amino acids, i.e. Q42R means that Q at position 42 is replaced with R.

The terms "polypeptide", and "peptide" are interchangeably used herein to refer to a polymer of amino acid residues and to variants and synthetic analogues of the same. Thus, these terms apply to amino acid polymers in which one or more amino acid residues is a synthetic non-naturally occurring amino acid, such as a chemical analogue of a corresponding naturally occurring amino acid, as well as to naturally-occurring amino acid polymers. Polypeptides can also undergo maturation or post-translational modification processes that may include, but are not limited to: glycosylation, proteolytic cleavage, lipidization, signal peptide cleavage, propeptide cleavage, phosphorylation, and such like. A peptide can be made using recombinant techniques, e.g., through the expression of a recombinant or synthetic polynucleotide. A recombinantly produced peptide it typically substantially free of culture medium, e.g., culture medium represents less than about 20%, more preferably less than about 10%, and most preferably less than about 5% of the volume of the protein preparation.

The term "protein" is used to describe a folded polypeptide having a secondary or tertiary structure. The protein may be composed of a single polypeptide, or may comprise multiple polypepties that are assembled to form a multimer. The multimer may be a homooligomer, or a heterooligmer. The protein may be a naturally occurring, or wild type protein, or a modified, or non-naturally, occurring protein. The protein may, for example, differ from a wild type protein by the addition, substitution or deletion of one or more amino acids.

As used herein, the term "solid-state nanopore" refers to a structure comprising at least a solid-state membrane and a nano-sized aperture extending through the solid-state membrane. The nano-sized aperture is typically referred to herein as an "aperture" for convenience. The term "solid-state nanopore" encompasses a "hybrid nanopore". A hybrid nanopore comprises a solid-state nanopore, and further comprises a biomolecular pore situated at least partly within the nano-sized aperture. A solid-state nanopore or a hybrid nanopore may optionally comprise further components, such as a layer of amphipathic molecules disposed across the nano-sized aperture.

As used herein, the term "nano-sized" refers to a feature which has a dimension of the order of nanometres in size. Typically, a nano-sized feature has one or more dimensions less than about 1000 nm in size, e.g. about 0.5 nm to about 1000 nm in size. In the context of a solid-state nanopore, the "nano-sized aperture" is typically an aperture less than about 1000 nm in diameter, for example from about 0.5 nm to about 1000 nm in diameter.

The Chemical Surface Modification

The substrate used in the process of the invention and present in the product of the invention comprises a solid-state membrane and a chemical surface modification. The chemical surface modification comprises a layer which modifies one or more surface characteristics of the solid-state membrane.

The chemical surface modification may comprise one or more layers. Typically, the chemical surface modification consists of a single layer.

The chemical surface modification modifies one or more surface characteristics of the solid-state membrane in order to improve the suitability of the solid-state membrane for its intended subsequent use. Thus, the substrate (which comprises the solid-state membrane and the chemical surface modification) has improved suitability for its intended purpose compared to the solid-state membrane in the absence of the chemical surface modification.

Often, the chemical surface modification is a surface modification which improves the biological compatibility of the solid-state membrane. For example, the chemical surface modification may be a layer which prevents interaction between the solid-state membrane and environmental factors such as one or more of air, ionic solutions, biological fluids (such as blood, saliva or any other fluid comprising biological material), and solutions comprising a polymer, particularly a polypeptide or a polynucleotide. In particular, the chemical surface modification may be a layer which prevents interaction between the solid-state membrane and a polymer such as a polypeptide or a polynucleotide.

In some embodiments, the chemical surface modification may comprise an inert layer or a passivating layer. By "inert layer" is meant a layer which is resistant to reaction with environmental factors such as those listed above. By "passivating layer" is meant a layer which prevents the surface of the solid-state membrane from reacting with such environmental factors.

Depending on the intended subsequent use of the substrate, the chemical surface modification may modify any surface characteristic of the solid-state membrane. For instance, the chemical surface modification may modify a physical property or a chemical property of the surface of the solid-state membrane, Typically, the chemical surface modification modifies a surface characteristic of the solid-state membrane selected from one or more of hydrophobicity, chemical reactivity, chemical specificity and surface charge. For instance, the chemical surface modification may increase or decrease one or more of the hydrophobicity, chemical reactivity, chemical specificity and surface charge of the solid-state membrane.

By "chemical specificity" is meant the affinity of the solid-state membrane for a chemical species or a class of chemical species. Thus, modification of the chemical specificity of a surface of the solid-state membrane may increase or decrease the interaction between that surface and a particular molecule or molecules.

In a preferred embodiment, the chemical surface modification modifies the hydrophobicity of the solid-state membrane. The chemical surface modification may increase or decrease the hydrophobicity of the solid-state membrane; preferably, the chemical surface modification increases the hydrophobicity of the solid-state membrane. In other words, the solid-state membrane having a chemical surface modification thereon is preferably more hydrophobic than the solid-state membrane in the absence of the chemical surface modification.

A hydrophobic surface typically has a large contact angle with water. The "contact angle" is the angle that the air-water interface makes with the surface when a droplet of water is placed on the surface in air. The contact angle is measured inside the droplet. The contact angle corresponds to angle θ illustrated in FIG. 1. A hydrophobic surface discourages water from spreading over the surface and so encourages the droplet to minimise its area of contact with the surface. A hydrophobic surface therefore typically has a large contact angle with water, which can be greater than 90°.

Thus, in some embodiments the chemical surface modification increases the contact angle with water of the solid-state membrane. For instance, the contact angle with water of the chemical surface modification may be at least about 80°, or at least about 90°, in some cases about 100° or more.

In a particularly preferred embodiment, the chemical surface modification improves the ability of the solid-state membrane to support a layer of amphipathic molecules, such as lipids. This can be achieved in a multitude of ways. The chemical surface modification may increase the lipophilicity of the surface, for instance by increasing the hydrophobicity of the surface of the solid-state membrane. This will encourage the hydrophobic moieties of amphipathic molecules to adsorb upon the chemically modified surface. Alternatively, the chemical surface modification may increase the hydrophilicity of the surface of the solid-state membrane. This will encourage the hydrophilic moieties of the amphipathic molecules to adsorb upon the chemically modified surface. In an alternative example, the chemical surface modification may impart a charge to the surface of the solid-state membrane, and thus encourage ionic interactions with a charged moiety of the amphipathic molecules (if present).

As regards the location of the chemical surface modification, it is disposed on all or part of a surface of the solid-state membrane. The solid-state membrane is not particularly limited as to its shape. However, the solid-state membrane must have at least one surface. A surface of the solid-state membrane is a portion which, in the absence of chemical surface modification, is exposed to the environment. A surface of the solid-state membrane may be planar, but need not be planar.

Figure 2A:
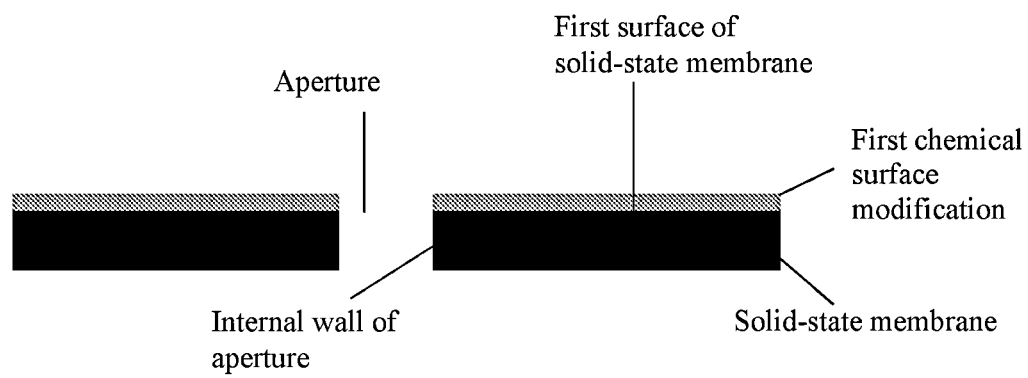
FIG. 2A is a cross-sectional view of a substrate as described herein comprising a solid-state membrane, wherein a first chemical surface modification is disposed on an entire first surface of the solid-state membrane and an aperture is formed through the substrate.
Figure 2B:
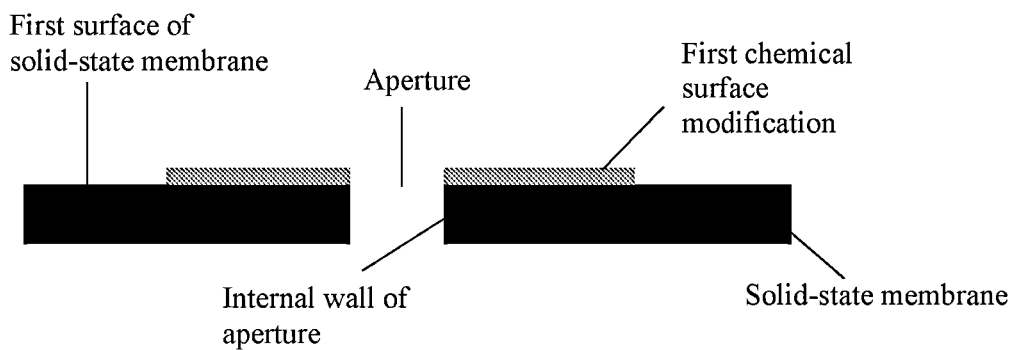
FIG. 2B is a cross-sectional view of a substrate as described herein similar to that shown in FIG. 2A, except that the first chemical surface modification is disposed on only part of the first surface of the solid-state membrane.

The chemical surface modification is disposed on all or part of at least one surface of the solid-state membrane. By "disposed on" is meant "in direct contact with". This is illustrated in FIGS. 2A and 2B, which show a cross-section through a substrate according to the invention in a plane which lies along the axis of the aperture. FIG. 2A shows a substrate wherein the chemical surface modification is disposed on all of one surface of the solid state membrane. FIG. 2B shows a substrate wherein the chemical surface modification is disposed on part of one surface of the solid-state membrane. As will be discussed in more detail below, the chemical surface modification is usually chemically bound to the surface of the solid-state membrane with which it is in contact.

The solid-state membrane may comprise more than one surface. In such cases, the chemical surface modification may be disposed on all or part of each of these surfaces, but need not be disposed on each of the surfaces. Where a chemical modification is disposed on more than one surface of the solid-state membrane, the chemical surface modification on each surface may be the same or different. Thus, the substrate may comprise a solid-state membrane comprising a plurality of surface with a chemical surface modification disposed on each surface, wherein each chemical surface modification is the same or different. For example, the substrate may comprise a solid-state membrane comprising a first surface and a first chemical surface modification disposed thereon; a second surface and a second chemical surface modification disposed thereon; and optionally one or more further surfaces with one or more further chemical surface modifications disposed thereon.

Figure 2C:
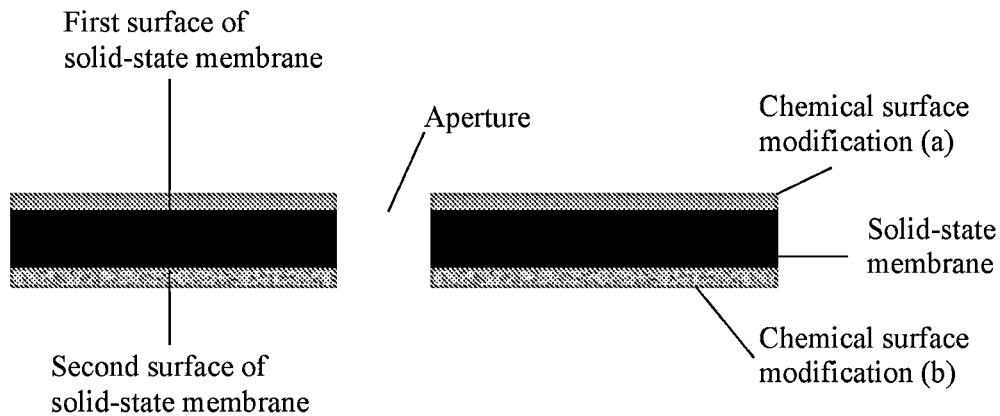
FIG. 2C is a cross-sectional view of a substrate as described herein similar to that shown in FIG. 2A, except that a second chemical surface modification is additionally disposed on a second surface of the solid-state membrane. The two chemical surface modifications are different; the first chemical surface modification is labelled (a) and the second chemical surface modification is labelled (b).

In a typical arrangement, the solid-state membrane takes the form of a layer. Typically, the solid-state membrane in the form of a layer comprises two opposing surfaces. A chemical surface modification may be disposed on all or part of one or both of these surfaces. In the exemplary embodiment illustrated in FIGS. 2A and 2B, a chemical surface modification is disposed on all of one surface of the solid-state membrane (FIG. 2A) or part of one surface of the solid-state membrane (FIG. 2B). In a further embodiment, illustrated in FIG. 2C, differing chemical surface modifications are disposed on each of two opposing surfaces of a solid-state membrane. The two opposing surfaces may be referred to as a first surface and a second surface respectively. Typically, where the substrate comprises a first surface having a first chemical surface modification disposed thereon and a second surface having a second chemical surface modification disposed thereon, the first and second chemical surface modifications are the same.

Figure 2D:
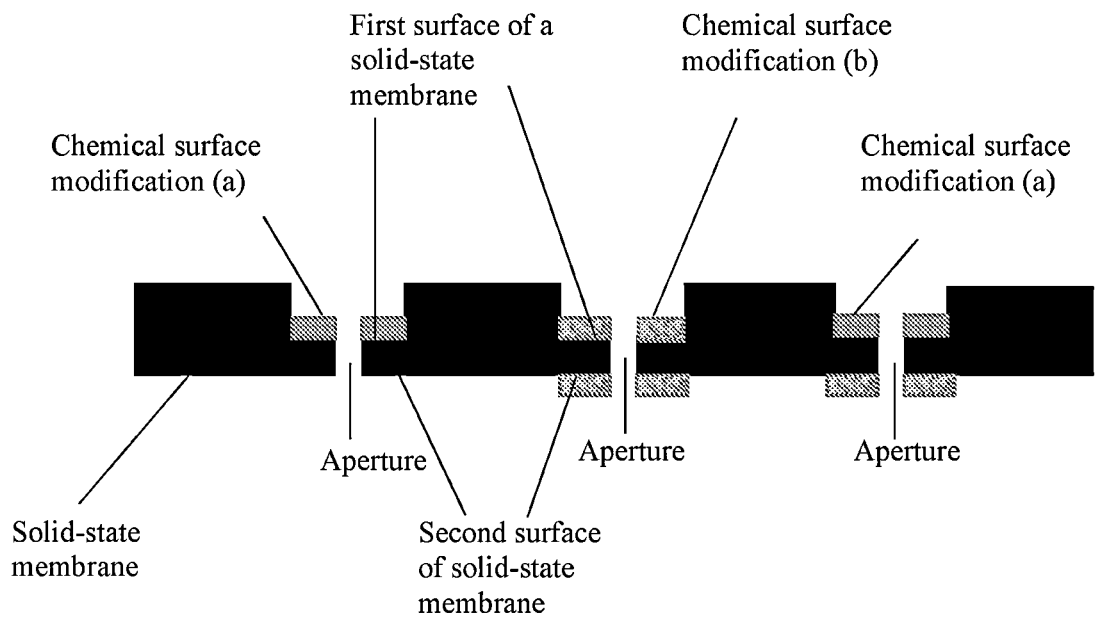
FIG. 2D is a cross-sectional view of a more complex substrate according to the invention. The substrate comprises three recesses, each of which has a first surface and a second surface. An aperture is formed through the substrate at each of the three recesses. Different chemical surface modifications are provided in each case. At the left-most recess, a first chemical surface modification of type (a) is present on the first surface of the solid-state membrane, but there is no chemical surface modification present on the second surface. At the central recess, a different type of chemical surface modification (labelled a second chemical surface modification) is provided on the first surface and the second surface of the solid-state membrane. Thus, the first chemical surface modification on the first surface and the second chemical surface modification on the second surface of the central recess are both of type (b). Yet another arrangement is shown in the rightmost recess. The first surface of the solid-state membrane has a first chemical surface modification disposed thereon, of type (a). However, the second surface of the solid-state membrane has a second chemical surface modification thereof of a different type, type (b).

In another typical arrangement, the solid-state membrane takes the form of a layer having one or more recesses. Such an arrangement is illustrated in FIG. 2D, which shows a cross-section through a substrate comprising three recesses in the solid-state membrane. Each recess creates a portion of the solid-state membrane which is thinner than the neighbouring regions of the solid-state membrane. Each of these thinner portions of the solid-state membrane has a pair of opposing surfaces. Conveniently, one of this pair of opposing surfaces at a recess may be termed the "first surface" and the other may be termed the "second surface". A chemical surface modification may be disposed on one of these surfaces, as shown in FIG. 2D (leftmost recess), where chemical surface modification (a) is disposed only on a first surface of the solid-state membrane. Alternatively a chemical surface modification may be disposed on both of the opposing surfaces, as shown by chemical surface modification (b) in FIG. 2D. Each chemical surface modification may be the same or different. At any pair of opposing surfaces, the chemical surface modification on the first surface and the chemical surface modification on the second surface (where present) may be the same or different. Usually they are the same.

The purpose of the chemical surface modification is to adjust how the solid-state membrane interacts with its environment. Accordingly, in general at least a part of the chemical surface modification is exposed when in use. By "exposed" is meant "exposed to the environment". Thus, the chemical surface modification is typically not embedded within the solid-state membrane. Rather, the chemical surface modification is exposed such that, in use, it may contact the environment. The chemical surface modification is generally formed by exposing the solid-state membrane to an environment comprising a chemical surface modification precursor, and so generally the whole of the chemical surface modification(s) is/are exposed.

The environment may typically be air, one or more ionic solutions, a layer of amphipathic molecules, and/or an analyte. Where the substrate comprises a first chemical surface modification on a first surface of the solid-state membrane and a second chemical surface modification on a second surface of the solid-state membrane, typically both of the said chemical surface modifications are exposed. However, they may be exposed to different environments. For instance, the first chemical surface modification on the first surface may be exposed to an analyte or an ionic solution comprising an analyte, while the second chemical surface modification on the second surface may be exposed to an ionic solution which is substantially free of analyte.

As regards the structure of the chemical surface modification, the chemical surface modification may comprise one or more layers. Typically the chemical surface modification consists of one layer.

The chemical surface modification typically does not constitute a rigid layer in its own right. Rather, it is a modification to the surface of the solid-state membrane. Accordingly, the chemical surface modification typically has a low total thickness. The thickness of the chemical surface modification may be defined as the largest extent of the chemical surface modification in a direction perpendicular to the surface of the solid state membrane which contacts the chemical surface modification.

Usually, the chemical surface modification is less than about 50 nm thick. In some embodiments, the chemical surface modification consists of a layer which is less than about 10 nm thick, preferably less than about 5 nm thick, more preferably less than about 2 nm thick. In a preferred embodiment, the chemical surface modification is one molecule thick, the molecule being the molecules used to form the chemical surface modification.

In some embodiments, the chemical surface modification may be up to about 10,000 atoms thick. Typically, the chemical surface modification has a thickness greater than the thickness of a single atom. The chemical surface modification is therefore typically about 1-10,000 atoms thick, for instance about 1 to 1000 atoms thick, e.g. about 2 to 500 atoms thick.

Thus, the chemical surface modification is typically about 0.01 to about 50 nm thick, for example about 0.01 to about 10 nm thick, e.g. about 0.01 to 5 nm thick or about 0.05 to 2 nm thick.

The chemical surface modification is generally not a self-supporting layer. Usually, the chemical surface modification does not comprise a polymer. In some embodiments, the chemical surface modification does not comprise an ionic lattice. In some embodiments, the chemical surface modification does not comprise a covalent lattice, e.g. typically the chemical surface modification does not comprise graphene.

Typically, the chemical surface modification comprises a plurality of molecules. In some embodiments, each molecule in the plurality of molecules is not bound to any other molecule in the plurality of molecules. In other embodiments, for instance where the molecules are derivatives of alkyl-trichlorosilanes, each molecule may be chemically cross-linked with one or more other molecule in the plurality of molecules.

Where the chemical surface modification comprises a plurality of molecules, the plurality of molecules are disposed on a surface of the solid-state membrane as described above. Thus, the chemical surface modification may comprise a first surface and a first chemical surface modification comprising a first plurality of molecules, the first plurality of molecules being disposed on the first surface of the solid-state membrane. Optionally, the substrate may also comprise a second surface and a second chemical surface modification comprising a second plurality of molecules, the second plurality of molecules being disposed on the second surface of the solid-state membrane. The substrate may also comprise one or more further surfaces and one or more further chemical surface modifications each comprising a further plurality of molecules, the further pluralities of molecules being disposed on the further surfaces of the solid-state membrane.

In some embodiments, the or each chemical surface modification may consist of a plurality of molecules.

In some embodiments, the plurality of molecules are arranged to form a monolayer. For example, where the chemical surface modification comprises a first surface and a first chemical surface modification comprising a first plurality of molecules, the plurality of molecules may be arranged to form a monolayer on a first surface of the solid-state membrane. The term "monolayer" takes its usual meaning, that the plurality of molecules are arranged in a layer one molecule thick. Thus, in some embodiments the chemical surface modification consists of a plurality of molecules arranged in a monolayer. However, the chemical surface modification may also consist of a plurality of molecules arranged in a bilayer, or in a multi-layer.

Molecules may be disposed on the solid-state membrane by any means. It is particularly convenient to allow the molecules to self-assemble on the surface of the solid-state membrane. Thus, in in some embodiments the chemical surface modification comprises a plurality of molecules which form a self-assembled layer, typically a self-assembled monolayer. Self-assembled multi-layer structures are also possible. For instance, the process of the invention may comprise providing a substrate comprising a chemical surface modification, wherein the chemical substrate comprises a plurality of molecules, by:

forming a first self-assembled monolayer comprising a first plurality of molecules; and forming one or more further self-assembled monolayers each comprising a further plurality of molecules;

or forming a self-assembled multilayer comprising a plurality of molecules.

The self-assembled layer (typically a self-assembled monolayer) is disposed on the solid-state membrane as discussed above. Thus, typically, the substrate comprises a solid-state membrane having a first surface, and a first chemical surface modification, wherein the first chemical surface modification comprises a first plurality of molecules arranged in a self-assembled layer on the first surface of the solid-state membrane. Typically the layer is self-assembled monolayer. Optionally, the solid-state membrane may comprise a second surface and the substrate may comprise a second chemical surface modification. The second chemical surface modification may comprise a second plurality of molecules arranged in a self-assembled layer on the second surface of the solid-state membrane. Typically the layer is a monolayer.

Where a chemical surface modification comprises a plurality of molecules arranged on a surface of the solid-state membrane, in an advantageous embodiment the plurality of molecules are arranged such that no reaction sites on the surface of the solid-state membrane are exposed through the chemical surface modification. This prevents any environmental factors from reacting with the solid-state membrane.

Typically, the chemical surface modification is chemically bound to the solid-state membrane. This makes the substrate more robust and more durable, increasing its lifetime and improving its ability to be re-used. The chemical surface may be covalently bound to the solid-state membrane, or may be ionically bound. For instance where the surface of the solid-state membrane is functionalised with groups capable of forming covalent bonds with the chemical surface modification, the chemical surface modification may be covalently bound to the solid-state membrane. Alternatively, where the surface of the solid-state membrane is functionalised with ionic groups, the chemical surface modification may be ionically bound to the solid-state membrane.

Preferably, the chemical surface modification is covalently bound to the solid-state membrane. There are techniques well-known in the art for providing a surface of a solid-state membrane with functional groups capable of forming covalent bonds with a chemical surface modification. For instance the surface may be functionalised with nucleophilic groups such as amines, hydroxy groups or thiols; these can bind covalently to a chemical surface modification by reactions such as nucleophilic addition reactions (e.g. esterification).

Thus, in a preferred embodiment, the substrate comprises a first surface and a first chemical surface modification, wherein the first chemical surface modification comprises a first plurality of molecules and each molecule in the first plurality of molecules is chemically bound to the first surface of the solid-state membrane. Preferably, each molecule in the first plurality of molecules is covalently bound to the first surface of the solid-state membrane. Optionally, the substrate may comprise a second surface and a second chemical surface modification, wherein the second chemical surface modification comprises a second plurality of molecules and each molecule in the second plurality of molecules is chemically bound to the second surface of the solid-state membrane. Preferably, each molecule in the second plurality of molecules is covalently bound to the second surface of the solid-state membrane.

Where the chemical surface modification comprises a plurality of molecules, the molecules are selected for their ability to modify any surface characteristic of the solid-state membrane. For instance, the molecules may modify a physical property or a chemical property of the surface of the solid-state membrane. Typically, the molecules may be selected for their ability to modify a surface characteristic of the solid-state membrane selected from one or more of hydrophobicity, chemical reactivity, chemical specificity, and surface charge. For instance, the molecules may be selected to increase or decrease one or more of the hydrophobicity, chemical reactivity, chemical specificity and surface charge of the solid-state membrane.

Generally, the chemical surface modification is intended to improve the biological compatibility of the solid-state membrane. Thus, typically, the said molecules are organic molecules.

In some embodiments, the molecules may be selected to increase hydrophilicity of the surface. For instance, in some embodiments the molecules may comprise a polar moiety or a charged moiety. Examples include carboxyl or carboxylate groups, and amine or quaternary ammonium groups.

In a preferred embodiment, the chemical surface modification modifies the hydrophobicity of the solid-state membrane and so the molecules are selected based on their ability to modify hydrophobicity. The molecules may increase or decrease the hydrophobicity of the solid-state membrane; preferably, the molecules increase the hydrophobicity of the solid-state membrane. Thus, in general, the said molecules comprise a hydrophobic moiety. Typically, therefore, the molecules are organic molecules comprising a hydrophobic moiety.

The hydrophobic moiety typically comprises an alkyl, alkenyl or alkynyl moiety, generally an alkyl or alkenyl moiety. The alkyl, alkenyl or alkynyl moiety may typically comprise 2 to 100 carbon atoms, for example from 2 to 50 carbon atoms or 5 to 25 carbon atoms. An alkenyl moiety may comprise one or more carbon-carbon double bonds. An alkynyl moiety may comprise one or more carbon-carbon triple bonds.

The alkyl or alkenyl moiety may optionally be substituted. Optional substituents upon the hydrophobic moiety may be selected from halogen, oxo, cyano, hydroxy, —$OR^a$, $C_{1\text{-}10}$ alkyl, $C_{3\text{-}10}$ cycloalkyl, $C_{4\text{-}10}$ cycloalkenyl, aryl, heteroaryl, heterocycloalkyl, $C_{1\text{-}10}$ alkenyl, $C_{1\text{-}10}$ alkynyl, —$SR^a$, —$SO_2R^a$, —$SOR^a$, —$SO_2NR^a$, —$S(O)(NR^a)R^a$, —$NR^a_2$, —$NR^aCOR^a$, —$NR^aCO_2R^a$, —$COR^a$, —$CO_2R^a$, and —$CONR^a_2$, wherein each $R^a$ is independently selected from H, $C_{1\text{-}10}$ alkyl, $C_{3\text{-}10}$ cycloalkyl, $C_{4\text{-}10}$ cycloalkenyl, aryl, heteroaryl, heterocycloalkyl, $C_{1\text{-}10}$ alkenyl, and $C_{1\text{-}10}$ alkynyl.

For instance, the hydrophobic may be an alkyl, alkenyl or alkynyl moiety comprising 0, 1, 2, 3, 4, 5 or 6 substituents selected from the above list, preferably 0, 1, 2, or 3 substituents selected from the above list.

The hydrophobic moiety may be chemically bound to solid-state membrane. More typically, though, the hydrophobic moiety is not bound to the solid-state membrane. Rather, the hydrophobic moiety is typically bound to a polar moiety. Said polar moiety is typically chemically bound to the solid-state membrane.

The molecules also usually comprise a moiety which is attached to the solid state membrane. This moiety is usually chemically bound to the solid state membrane, for instance covalently bound to the solid state membrane.

The molecules typically also comprise an electrophilic moiety. The electrophilic moiety is useful as it can be easily attached to a functionalised surface of the solid state membrane. The electrophilic moiety is typically also bound to a hydrophobic moiety.

Examples of a suitable electrophilic moiety include —$CX_2$—; —$C(=O)$—; —$C(=O)O$—; $OC(=O)$—; —$SO_2$—; —$C(=O)$—$NR^b$—; —$SiX_2$—; —$SiXOR^b$—; —$Si(OR^b)_2$— or —$Si(=O)$—, wherein each X is independently a halogen or cyano group; and
each $R^b$ is independently selected from H, $C_{1\text{-}10}$ alkyl, $C_{3\text{-}10}$ cycloalkyl, $C_{4\text{-}10}$ cycloalkenyl, aryl, heteroaryl, heterocycloalkyl, $C_{1\text{-}10}$ alkenyl, and $C_{1\text{-}10}$ alkynyl. Each $R^b$ may be optionally substituted. Optional substituents upon $R^b$ include halogen, oxo, cyano, hydroxy, —$OR^a$, $C_{1\text{-}10}$ alkyl, $C_{3\text{-}10}$ cycloalkyl, $C_{4\text{-}10}$ cycloalkenyl, aryl, heteroaryl, heterocycloalkyl, $C_{1\text{-}10}$ alkenyl, $C_{1\text{-}10}$ alkynyl, —$SR^a$, —$SO_2R^a$, —$SOR^a$, —$SO_2NR^a$, —$S(O)(NR^a)R^a$, —$NR^a_2$, —$NR^aCOR^a$, —$NR^aCO_2R^a$, —$COR^a$, —$CO_2R^a$, and —$CONR^a_2$, wherein each $R^a$ is independently selected from H, $C_{1\text{-}10}$ alkyl, $C_{3\text{-}10}$ cycloalkyl, $C_{4\text{-}10}$ cycloalkenyl, aryl, heteroaryl, heterocycloalkyl, $C_{1\text{-}10}$ alkenyl, and $C_{1\text{-}10}$ alkynyl. Preferred substituents on $R^b$ include hydroxy, $C_{1\text{-}10}$ alkyl, —$OR^a$, and —$NR^a_2$.

However, the skilled person will appreciate that other electrophilic moieties may also be suitable.

In general, therefore, where the chemical surface modification comprises a plurality of molecules, the molecules have the general formula:

-E-R wherein:
E is covalently bound to the solid-state membrane;
E is an electrophilic moiety selected from —$CX_2$—; —$C(=O)$—; —$C(=O)O$—; —$OC(=O)$—; $SO_2$—; —$C(=O)$—$NR^b$—; —$SiX_2$—; —$SiXOR^b$—; —$Si(OR^b)_2$— or —$SiO$—, where each X is independently a halogen or cyano group;
R is a $C_{1\text{-}50}$ alkyl, $C_{2\text{-}50}$ alkenyl or $C_{2\text{-}50}$ alkynyl moiety, which may be unsubstituted or substituted by one or more substituents each independently selected from halogen, oxo, cyano, hydroxy, —$OR^a$, $C_{1\text{-}10}$ alkyl, $C_{3\text{-}10}$ cycloalkyl, $C_{4\text{-}10}$ cycloalkenyl, aryl, heteroaryl, heterocycloalkyl, $C_{1\text{-}10}$ alkenyl, $C_{1\text{-}10}$ alkynyl, —$SR^a$, —$SO_2R^a$, —$SOR^a$, —$SO_2NR^a$, —$S(O)(NR^a)R^a$, —$NR^a_2$, —$NR^aCOR^a$, —$NR^aCO_2R^a$, —$COR^a$, —$CO_2R^a$, and —$CONR^a_2$; and each $R^a$ is independently selected from H, $C_{1\text{-}10}$ alkyl, $C_{3\text{-}10}$ cycloalkyl, $C_{4\text{-}10}$ cycloalkenyl, aryl, heteroaryl, heterocycloalkyl, $C_{1\text{-}10}$ alkenyl, and $C_{1\text{-}10}$ alkynyl.

Preferably, R is a $C_{2\text{-}25}$ alkyl, $C_{2\text{-}25}$ alkenyl or $C_{2\text{-}25}$ alkynyl moiety, which may be unsubstituted or substituted by one, two or three substituents independently selected from halogen, oxo, cyano, hydroxy, —$OR^a$, $C_{1\text{-}10}$ alkyl, $C_{3\text{-}10}$ cycloalkyl, $C_{4\text{-}10}$ cycloalkenyl, aryl, heteroaryl, heterocycloalkyl, $C_{1\text{-}10}$ alkenyl, $C_{1\text{-}10}$ alkynyl, —$SR^a$, —$SO_2R^a$, —$SOR^a$, —$SO_2NR^a$, —$S(O)(NR^a)R^a$, —$NR^a_2$, —$NR^aCOR^a$, —$NR^aCO_2R^a$, —$COR^a$, —$CO_2R^a$, and —$CONR^a_2$.

X is preferably a halogen.

In a preferred embodiment, the molecules are derivatives of organosilane molecules. For example, in certain embodiments the molecules are molecules having the formula -E-R wherein:

E is selected from —SiX$_2$—, —SiXOR$^b$—; —Si(OR$^b$)$_2$— or —SiO—, where each X is independently a halogen or cyano group; and R is a C$_{2-25}$ alkyl or C$_{2-25}$ alkenyl group, which may be optionally substituted by one, two or three substituents selected from one, two or three substituents independently selected from halogen, oxo, cyano, hydroxy, —OR$^a$, C$_{1-10}$ alkyl, C$_{3-10}$ cycloalkyl, C$_{4-10}$ cycloalkenyl, aryl, heteroaryl, heterocycloalkyl, C$_{1-10}$ alkenyl, C$_{1-10}$ alkynyl, —SR$^a$, —SO$_2$R$^a$, —SOR$^a$, —SO$_2$NR$^a$, —S(O)(NR$^a$)R$^a$, —NR$^a{}_2$, —NR$^a$COR$^a$, —NR$^a$CO$_2$R$^a$, —COR$^a$, —CO$_2$R$^a$, and —CONR$^a{}_2$.

In a further embodiment, the molecules are molecules having the formula -E-R wherein:

E is —SiX$_2$— and each X is a halogen atom, preferably a chlorine atom; and

R is an unsubstituted C$_{2-25}$ alkyl or C$_{2-25}$ alkenyl group.

In yet a further embodiment, the organosilane molecules are derivatives of octadecyltrichlorosilane, comprising a group having the formula —SiCl$_2$—C$_{18}$H$_{37}$ or consisting of a group having the formula —SiCl$_2$—C$_{18}$H$_{37}$.

the Solid-State Membrane

In addition to a chemical surface modification, the substrate comprises a solid-state membrane. The solid-state membrane usually comprises a material which is susceptible to dielectric breakdown. Thus, in a typical embodiment the solid-state membrane comprises a dielectric material. A dielectric material is an electrical insulator which can be polarised by an applied electric field.

The solid-state membrane is not particularly limited as to its shape. However, it is typically in the form of a wafer, chip or layer. Thus, typically the solid-state membrane comprises a layer of a dielectric material.

The solid state membrane may comprise either or both of organic and inorganic materials, including, but not limited to, microelectronic materials, whether electrically conducting, electrically semiconducting, or electrically insulating, including materials such as II-IV and III-V materials, oxides and nitrides, such as silicon nitride, Al$_2$O$_3$, and SiO$_2$, Si, MoS$_2$, solid state organic and inorganic polymers such as polyamide, plastics such as Teflon®, or elastomers such as two-component addition-cure silicone rubber, and glasses. A membrane may be formed from monatomic layers, such as graphene, or layers that are only a few atoms thick such as those disclosed in U.S. Pat. No. 8,698,481, and U.S. Patent Application Publication 2014/174927, both hereby incorporated by reference. More than one layer of material can be included, such as more than one graphene layer, as disclosed in US Patent Application Publication 2013/309776, incorporated herein by reference. Suitable silicon nitride membranes are disclosed in U.S. Pat. No. 6,627,067, and the membrane may be chemically functionalized, such as disclosed in U.S. Patent Application Publication 2011/053284, both hereby incorporated by reference.

Generally, the solid-state membrane comprises one or more of a ceramic, a solid state organic polymer, a solid state inorganic polymer, or a glass. Preferably, the solid-state membrane comprises a ceramic. For instance, the solid-state membrane preferably comprises a dielectric ceramic material.

In some embodiments, the solid-state membrane comprises a transition metal, a lanthanide or an element from Group III, Group IV or Group V. For instance, the solid-state membrane may comprise an oxide or a nitride of a transition metal, a lanthanide or an element of Group III, Group IV or Group V. In a preferred embodiment, the solid-state membrane may comprise one or more of Si, Al, Hf and Zr. For instance, the solid-state membrane may comprise an oxide or nitride of Si, Al, Hf or Zr.

In a preferred embodiment, the solid-state membrane comprises a nitride and/or oxide of silicon and/or aluminium. That is, the solid-state membrane may comprise one or more of a silicon nitride, an aluminium nitride, a silicon oxide or an aluminium oxide. Preferred among these are a silicon nitride and an aluminium oxide.

For example, the solid-state membrane may comprise a compound of formula SiN$_x$, wherein x is from about 1 to about 2. In a particularly preferred embodiment, the solid-state membrane may comprise a layer of silicon nitride of formula SiN$_x$, wherein x is from about 1 to about 2, and which is a dielectric material.

The solid-state membrane may comprise a plurality of layers. Where the solid-state membrane comprises a plurality of layers, each layer may be referred to as a sub-layer. The composition of each sub-layer may be the same or different. Each sub-layer preferably has a composition as described herein in relation to the solid-state membrane. Thus, for instance, it is preferred that each sub-layer comprises one or more of a ceramic, a solid state organic polymer, a solid state inorganic polymer, or a glass. Preferably, each sub-layer of the solid-state membrane comprises a ceramic. For instance, each sub-layer of the solid-state membrane preferably comprises a dielectric ceramic material.

There are advantages to providing a solid-state membrane having a plurality of layers. Forming the membrane from multiple sub-layers of different composition using atomic layer deposition makes it possible to control the geometry of apertures formed in the solid-state membrane with high accuracy, even where the solid-state membrane is extremely thin. Atomic layer deposition allows very uniform and precise thickness control at resolutions of the order of ~1 Å. Materials which are inert to many reactive ion etch (RIE) processes can be applied using atomic layer deposition. The level of control provided by atomic layer deposition is higher than can be achieved typically using alternative film growth techniques.

The length of the aperture formed in the solid-state membrane is dictated by the thickness of the substrate in which the aperture is formed. Where the thickness of the solid-state membrane (and hence the substrate) is controlled, the length of the aperture can also be controlled with high accuracy. This is advantageous as, where the aperture is used for sensing a molecular entity (e.g. DNA material) passing through the aperture, performance (e.g. the ability to distinguish between different DNA bases) has been found to depend critically on the diameter and length of the aperture. Improving the accuracy with which the diameter and/or length can be controlled improves performance.

In addition, forming the membrane from multiple sub-layers of different composition using atomic layer deposition provides an aperture that is highly stable during use. For example, the diameters and lengths of apertures formed in this way have been found to remain stable over long periods of time (e.g. several weeks or over a month) during use. In an embodiment, the plurality of sub-layers comprises a sequence of sub-layers that repeats a plurality of times, each repeating sequence comprising at least a first sub-layer and a second sub-layer directly adjacent to the first sub-layer, preferably with the first sub-layers being non-epitaxial with respect to the second sub-layers. The use of such a repeating sequence of non-epitaxial sub-layers reduces the formation of defects due to crystal growth within the sub-layers, preserving an amorphous film. The quality of the sub-layers, and the quality and integrity of the overall membrane, is thereby improved, by improving uniformity and/or reducing defect concentration.

In an embodiment, the plurality of sub-layers is annealed prior to formation of the aperture. The anneal may be performed below a temperature at which significant crystallization in the sub-layers might occur. Alternatively, the anneal may be performed at higher temperatures. The anneal improves the quality of the sub-layers (e.g. improving uniformity and/or reducing defect concentration). Improving the quality of the sub-layers reduces electrical leakage through the sub-layers, which could otherwise disrupt optimal formation of apertures using dielectric breakdown.

The solid-state membrane permits the formation of an aperture therethrough. Thus, the solid-state membrane typically has one or more thin regions through which an aperture may be easily formed. However, the shape of the solid-state membrane is highly variable. For instance, as shown in FIG. 2D, where the solid-state membrane is in the form of a layer it can have one or more regions of low thickness where an aperture may be easily formed, but may also have regions of greater thickness.

The "thickness" of the solid-state membrane at any given point may be defined as the shortest distance between two opposing faces of the solid-state membrane. Typically, and especially where the solid-state membrane is in the form of a layer, the thickness is the shortest distance between two opposing parallel, planar faces of the solid-state membrane. The thickness is measured in a direction parallel to the axis of the aperture(s), when formed. The solid-state membrane has an "average thickness" which is defined as the mean of all thicknesses of the solid-state membrane.

A region of the solid-state membrane where the solid-state membrane is thinner (i.e. has a shorter distance between opposing faces of the solid-state membrane) than a neighbouring region of the solid-state membrane is referred to as a recess. Where the solid-state membrane comprises a recess, the thickness of the solid-state membrane at the recess will typically be at least 10% less and may be at least 20%, 30%, 40%, 50%, 60%, 70%, 80%, 90%, 95% or 99% less than an average thickness of the membrane in regions where recesses are not present.

In some embodiments, the solid-state membrane is in the form of a layer. Typically, the solid-state membrane (for instance in the form of a layer) comprises one or more recesses.

In some embodiments, the solid-state membrane may be in the form of an approximately uniform layer, in which case the solid-state membrane has an average thickness of from about 1 to about 100 nm, preferably from about 2 to about 30 nm, more preferably from about 5 to about 20 nm. In other embodiments, the solid-state membrane does not have a uniform thickness. The solid-state membrane may have thicker portions (for instance to provide a robust and durable substrate) and thinner portions so as to favour dielectric breakdown and formation of an aperture(s) in that particular region relative to other regions.

Typically, the solid-state membrane has an average thickness in the vicinity of the aperture of from about 1 to 100 nm, preferably from about 2 to 30 nm, more preferably from about 5 to 20 nm. In a particularly preferred embodiment, the solid-state membrane has an average thickness in the vicinity of the aperture of from 0.5 to 15 nm, more preferably from 1 to 10 nm or 1 to 5 nm, for example from 1 to 4 nm. By "in the vicinity of the aperture" is meant a thickness of the solid-state membrane immediately adjacent to the aperture. The low thickness such as less than about 50 nm or less than about 25 nm, is preferable as it permits the aperture to be formed by dielectric breakdown. However, it is also useful to have a membrane which is not too thin, for instance at least 1 nm thick to provide durability and robustness.

A further reason to employ a thin solid-state membrane is that, as explained in WO 2016/187519 (which is incorporated by reference), the size of an aperture can be controlled by controlling the thickness of the solid-state membrane. When forming an aperture by dielectric breakdown of a dielectric material, the rate of growth of the aperture reduces suddenly when the diameter of the aperture is equal to or slightly greater than a thickness of membrane material (typically between about 1 and 1.5 times the thickness of the membrane material) in which the aperture is being formed. This is because the access resistance becomes significant when the aperture diameter is comparable to the aperture thickness, which results in the voltage drop across the aperture being reduced. In other words, the access resistance acts as a limiting resistor. By deliberately growing the aperture until this point is reached it is possible to control the diameter of the aperture accurately without sophisticated electronics. Further, it is possible to provide a plurality of apertures simultaneously, all having similar dimensions, even where those apertures may have started growing at slightly different times and/or have undergone slightly different growth rates. This is because when the diameters of some of the apertures become equal to or greater than the thickness of the solid-state membrane where they are formed, the other apertures will quickly catch up, thereby leading to a highly uniform size distribution (for example such that a diameter variation between different apertures is within about 10-20% or better).

A thin membrane therefore permits the formation of multiple similarly-sized apertures, and permits the formation of apertures having a particularly low diameter.

The Substrate

The substrate comprises a solid-state membrane and a chemical surface modification, as described above. In some embodiments, the substrate may consist of a solid-state membrane and a chemical surface modification. It should be noted that where the substrate consists of a solid-state membrane and a chemical surface modification, this does not exclude the possibility that one or more surfaces of the solid-state membrane may be chemically functionalised.

The substrate may comprise other components. For instance, the substrate may comprise a support, for instance in the form of a thick layer. A support may for instance comprise a silicon wafer or a glass wafer.

The invention provides a process for producing a substrate comprising an aperture, and also a substrate comprising an aperture which is obtained or obtainable by the process described herein. It is preferred that the substrate comprising an aperture is obtained by a process as described herein.

The Aperture

The aperture is a hole extending through the membrane. The aperture extends through the whole thickness of the membrane. That is, the aperture extends from one surface of the solid-state membrane to another surface of the solid-state membrane.

For example, the solid-state membrane may have a first surface and a second surface, and the aperture may extend from the first surface to the second surface of the solid-state membrane. Where the solid-state membrane is in the form of a layer, or comprises a portion in the form of a layer, the solid-state membrane may have a first surface and a second surface which are parallel to one another, and the aperture may extend from the first surface to the second surface.

The aperture has an internal wall. The internal wall is the surface of the solid-state membrane exposed by formation of the aperture. The internal wall of the aperture is therefore the surface of the solid-state membrane which contacts the aperture. The internal wall may comprise a chemical surface modification or any other coating.

The aperture has an axis, which is the imaginary line extending through the centre of the aperture in its direction from one surface of the solid-state membrane to another surface of the solid-state membrane. The aperture has a length, which is equal to the thickness of the solid-state membrane in which it is formed.

In an embodiment where the solid-state membrane is in the form of a layer, or comprises a portion in the form of a layer, the aperture typically extends substantially perpendicular to the plane of the layer. in this embodiment, the aperture's axis typically sits substantially perpendicular to the plane of the solid-state membrane.

The shape of the aperture is not particularly limited. However, the aperture is generally approximately cylindrical in shape, with each approximately circular end of the cylindrical aperture located at a surface of the solid-state membrane. In this embodiment, the axis of the aperture is the imaginary line joining the centres of the two approximately circular ends of the cylindrical aperture.

The process of the invention may be used to generate a range of sizes of apertures. The size of an aperture is generally indicated by the diameter of the aperture. The diameter of an aperture is the greatest extent of the aperture in a direction perpendicular to its axis.

For instance, the process may generate one or more apertures having a diameter ranging from 0.1 nm to 100 nm, such as from 1.0 nm to 10 nm. One or more apertures having a diameter of 0.5 nm, 0.6 nm, 0.7 nm, 0.8 nm, 0.9 nm, 1.5 nm, 2 nm, 3 nm, 4 nm or 5 nm may be produced.

Thus, usually, in the process of the invention, the aperture generated has a diameter of less than about 100 nm. Preferably, in the process of the invention, the aperture generated has a diameter of less than about 50 nm. A particular advantage of the process of the invention is that it may be used to generate small apertures. Thus, it is particularly preferred in the process of the invention that the aperture generated has a diameter of from about 0.1 to 10 nm, preferably from about 0.1 to 5 nm. For instance, the process of the invention may be used to generate apertures having a diameter of about 0.5 nm, 1 nm, 2 nm, 3 nm, 4 nm or 5 nm.

Formation of the Aperture

The process of the invention comprises a step of forming an aperture, within a solid-state membrane which comprises a chemical surface modification. In one embodiment, the method of generating the aperture is dielectric breakdown of the solid-state membrane. The present inventors have found that that dielectric breakdown is a particularly effective method which does not destroy the chemical surface modification. Moreover, dielectric breakdown allows apertures to be formed quickly and cheaply, and even permits the formation of multiple apertures simultaneously. Dielectric breakdown also permits the formation of small apertures with excellent control over their diameter and length, by controlling the thickness of the solid-state membrane in which the aperture is formed. Thus, usually, the step of forming an aperture through the chemical surface modification and the solid-state membrane comprises causing dielectric breakdown of the solid-state membrane.

The method of dielectric breakdown to generate apertures is described in detail in WO 2016/187519, the entirety of which is incorporated herein by reference. The corresponding United States patent publication US 2018/0141007, is also incorporated herein by reference in its entirety.

As explained above, the aperture is formed in a substrate. The substrate comprises a solid-state membrane, and the aperture (when formed) extends from one surface of the solid-state membrane to another surface of the solid state membrane. One or both of the said surfaces of the solid-state membrane comprises a chemical surface modification. As discussed in WO 2016/187519, the step of forming an aperture by dielectric breakdown comprises contacting a first electrode with a first ionic solution in contact with the chemical surface modification on the first surface of the solid state membrane, and contacting a second electrode with a second ionic solution in contact with a second surface of the solid state membrane or a chemical surface modification thereon, and applying a first voltage across the solid state membrane.

It should be noted that contacting a surface of a solid-state membrane, or contacting a chemical surface modification of the solid-state membrane, with an ionic solution does not require the ionic solution to contact the said surface or the said chemical surface modification directly. In some embodiments, there may be an intervening layer of amphipathic molecules between the ionic solution and the surface or the chemical surface modification. For instance, where the ionic solution comprises amphipathic molecules and the chemical surface modification means that the surface is highly hydrophobic or highly hydrophilic, amphipathic molecules may spontaneously assemble on the chemical surface modification and thus create an intervening layer of amphipathic molecules. It should therefore be understood that "contacting" a surface of a solid-state membrane, or "contacting" a chemical surface modification of the solid-state membrane, with an ionic solution refers to contacting the aforementioned species directly or indirectly with one another. For instance, "contacting" a surface of a solid-state membrane, or "contacting" a chemical surface modification of the solid-state membrane, with an ionic solution may be taken to refer to contacting the aforementioned species directly or via one or more intervening layers of amphipathic molecules.

Accordingly, the process of the invention typically comprises:— providing a substrate which comprises
a solid-state membrane having a first surface and a second surface;
a first chemical surface modification on the first surface of the solid state membrane; and
optionally a second chemical surface modification on the second surface of the solid state membrane; and
contacting the first chemical surface modification with a first ionic solution, and contacting a second surface of the solid-state membrane (or the second chemical surface modification thereon) with a second ionic solution; and applying a voltage across the solid-state membrane via first and second electrodes in respective contact with the first and second ionic solutions to form one or more apertures through the solid-state membrane and the first (and optionally the second) chemical surface modifications.

The first and second ionic solutions may comprise different ions from each other. The ionic strength of the two ionic solutions may differ. As an alternative to the provision of an ionic solution, the first and/or second ionic solutions may instead be a first and a second ionic liquid.

The dielectric breakdown method is highly advantageous for the generation of apertures, as discussed above. However, once an aperture has been generated, current is permitted to flow across the substrate through the aperture. This can alter the applied electrical field in the vicinity of the aperture. This is undesirable, especially where the voltage is used to form multiple apertures. It is therefore preferred that, where dielectric breakdown is used to generate an aperture, measures are taken to minimise disruption to the electric field caused by generation of an aperture. Typically, this is achieved by inclusion of a current limiting resistor which reduces the flow of current across an aperture.

Thus, in a preferred aspect of the method of the invention, the step of forming an aperture comprises contacting the first chemical surface modification with a first ionic solution, and contacting a second surface of the solid-state membrane (or the second chemical surface modification thereon) with a second ionic solution; and applying a voltage across the solid-state membrane via first and second electrodes in respective contact with the first and second ionic solutions to form one or more apertures through the solid-state membrane and the first (and optionally the second) chemical surface modifications, wherein a current limiting resistor is disposed between the first electrode and the second electrode.

In some embodiments, the current limiting resistor may be provided within the substrate itself. This can be achieved by ensuring that the substrate comprises a fluidic resistor during the dielectric breakdown step. An exemplary means of providing a fluidic resistor is to form the aperture in contact with a recess in the solid-state membrane. If the recess is narrow, it forms a small fluid channel having a high electrical resistance and thus reduces the passage of current across the solid-state membrane when the aperture forms. A narrow recess having a high electrical resistance may be referred to as a fluidic passage.

Figure 3:
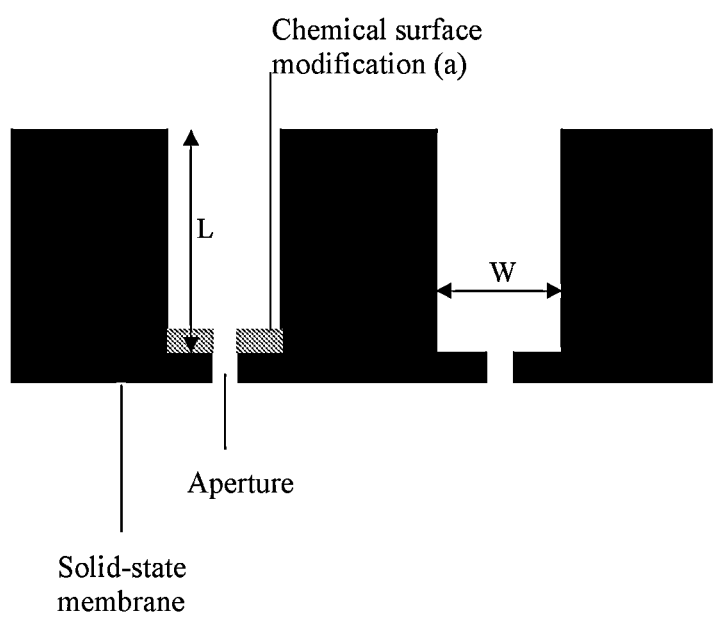
FIG. 3 illustrates a substrate as described herein having two recesses with a large aspect ratio, i.e. two recesses which are deeper than they are long. The length and width of a recess are shown by letters L and W. As previously, each recess provides a first surface and second surface of the solid-state membrane.

For example, the recess may have an aspect ratio of greater than 1, optionally greater than 5, optionally greater than 10, optionally greater than 20, optionally greater than 30, optionally greater than 40, optionally greater than 50, optionally greater than 75, optionally greater than 100. The aspect ratio is defined as a ratio of a length of the recess to a width of the recess. The length of a recess is defined as the greatest depth to which the recess extends into the solid-state membrane. The width of a recess is defined as the greatest dimension of the recess perpendicular to its length. These values are illustrated as length (L) and width (W) in FIG. 3. Recesses having a high aspect ratio will typically have a fluidic electrical resistance that is higher than recesses having a lower aspect ratio. Such recesses can act as current limiting resistors, reducing the voltage across the membrane significantly when the aperture is formed.

In order to generate an aperture in contact with such a recess, typically the first surface and/or the second surface of the solid-state membrane contacts a recess (either directly or via a chemical surface modification).

In an embodiment, an aperture formed by the process of the invention or an aperture present in the substrate of the invention contacts a recess, and has a fluidic electrical resistance of less than 10 times the fluidic electrical resistance of the recess, optionally less than 5 times, optionally less than 2 times. In an embodiment, an aperture formed by the process of the invention or an aperture present in the substrate of the invention contacts a recess, and has a fluidic electrical resistance that is less than the fluidic electrical resistance of the recess. Arranging for the fluidic electrical resistance of a recess be a least a significant portion (e.g. between about 0.05 and 0.5) of the fluidic electrical resistance of the aperture in this manner ensures that after aperture formation there is a significant voltage drop along the length of the fluidic resistor, reducing the voltage drop across the solid-state material in the region of the aperture. Furthermore, providing recesses having a significant fluidic electrical resistance reduces the effect of the formation of an aperture in one recess on the electrical field in any neighbouring recess. Even in a case where an erroneously large aperture is formed in one recess, the fluidic electrical resistance of the recess itself will prevent any excessive reduction in the electrical field in neighbouring recesses, such that apertures can still be correctly formed in those recesses.

Alternatively, an external current limiting resistor may be used. Thus, in some embodiments the step of forming an aperture comprises contacting the first chemical surface modification with a first ionic solution, and contacting a second surface of the solid-state membrane (or the second chemical surface modification thereon) with a second ionic solution; and applying a voltage across the solid-state membrane via first and second electrodes in respective contact with the first and second ionic solutions to form one or more apertures through the solid-state membrane and the first (and optionally the second) chemical surface modifications, wherein an external current limiting resistor is provided in series between the membrane and the first or second electrode. Typically, the current limiting resistor has an electrical resistance which is at least 2% or at least 5%, for example at least 10% as high as an electrical resistance of the aperture at any time after formation of the aperture. The current limiting resistor may optionally have an electrical resistance at least 20%, optionally at least 50%, optionally at least 100% as high as the electrical resistance of the aperture.

The external current limiting resistor increases the reduction of voltage across the aperture when the aperture is formed, relative to a case where the external current limiting resistor is not provided. The external current limiting resistor be provided at least partially outside of the first and second ionic solutions. The external current limiting resistor may be a conventional resistor of the passive solid state type which is routinely used in electrical circuits not involving fluids.

It is of course possible to combine the above embodiments, and to provide a current limiting resistance system which comprises a fluidic resistor and an external current limiting resistor.

The current limiting resistor provides a simple way of controlling the rate of the aperture diameter growth process without sophisticated and expensive electronics. The current limiting resistor determines the eventual aperture diameter at a given applied voltage. The approach is simpler than known alternatives in which electronic feedback is used to cut off the voltage when dielectric breakdown begins, or in which very short voltage pulses are used to allow the voltage to be stopped quickly enough. However, such known methods of controlling the aperture diameter growth process may alternatively be used.

In order to form and grow the aperture using dielectric breakdown, a voltage is applied across the solid-state membrane. In an embodiment, a substantially constant uninterrupted voltage is applied for a majority of a time during which the aperture is formed and grown by the voltage. The voltage applied to initiate aperture formation may be referred to as the "first voltage".

Once an aperture has been generated, current will begin to leak across the solid state membrane between the first and second ionic solutions. Accordingly, the first voltage is typically applied until a current leakage is detected (a current leakage being a current flowing across the solid-state membrane). In an embodiment, the step of forming the aperture comprises applying a first voltage across the solid-state membrane until a stable current leakage across the solid-state membrane is detected. A stable current leakage is a current flowing across the solid-state membrane which has low variation, for example a variation of 20% or less, preferably 10% or less.

The first voltage must be sufficient to initiate dielectric breakdown of the solid-state membrane. Thus, the first voltage is typically at least 1V or more, for instance at least 5V or more, preferably at least 10V. For instance, the first voltage may be about 5 to 20 V, preferably about 5 to 15 V, e.g. about 10 V.

The first voltage may be applied in pulsed fashion or may be a steady voltage.

In another embodiment which is particularly applicable where the first or second surface of the solid-state membrane contacts a recess in the solid state membrane, a first voltage is applied that initiates aperture formation, and one or more differing voltages may be applied thereafter. The first voltage may be applied for a relatively short time, for instance up to 500 ms or up to 200 ms. By way of example a first voltage may be applied for 100 ms in a configuration for forming one or more apertures 10-20 nm in diameter. In an embodiment, therefore the step of forming an aperture comprises applying a first voltage across the solid-state membrane for up to about 500 ms, for instance for up to about 200 ms or up to about 100 ms.

A second voltage may then be applied which is lower than is necessary to initiate formation of an aperture. The second voltage is applied to grow the existing aperture(s) without generating any new aperture(s).

The second voltage is typically applied for longer than the first voltage. The second voltage is typically applied for at least 1 second, preferably for at least 10 seconds, for instance at least 30 seconds. By way of example the second voltage may be applied for about 1 second to about 5 minutes, preferably about 10 seconds to about 2 minutes, e.g. about 1 minute.

The second voltage is typically of smaller magnitude than the first voltage. The second voltage is typically about 99% or less of the first voltage, preferably about 95% or less of the first voltage, e.g. about 90% or less of the first voltage. By way of example, the second voltage is typically about 50% to 99% of the first voltage, preferably about 75% to about 95% of the first voltage.

In terms of absolute values, the second voltage is typically less than 20 V, more usually less than 15 V and preferably less than 10 V. For example, the second voltage may be 1 to 15 V, more preferably 5 to 10 V.

The second voltage may be applied until a stable current leakage is detected.

The second voltage is applied to grow the aperture, and the current leakage will increase as the diameter of the aperture increases. The current leakage may increase while nonetheless being stable. A stable current leakage is one which varies by less than 20%, preferably less than 10%, over short periods (for instance over a period of about is or about 0.5 s). However, a stable current leakage may nonetheless gradually increase over time as the aperture(s) in the solid state membrane grow(s). Thus, in some embodiments the step of forming the aperture comprises applying the second voltage across the solid-state membrane until a stable current leakage reaches a threshold value.

The threshold value will vary significantly dependent on the first and second ionic solutions, the dimensions of the desired aperture, and the electrode step (for instance, the resistivity of the circuit). A suitable threshold value in each instance may be readily determined by the skilled person by simply detecting the stable leakage current after varying periods of application of the second voltage, and measuring the aperture diameter obtained. A suitable threshold current may be selected based on the desired aperture diameter.

In some embodiments, a third voltage is applied after the first and second voltages. The third voltage is equal to or higher than the first voltage. The third voltage is applied for a longer time than either or both of the first and second voltages. The third voltage acts to homogenize (make more uniform) the aperture diameters.

Accordingly, in a preferred embodiment, the process of the invention comprises:— providing a substrate which comprises
  a solid-state membrane having a first surface and a second surface;
  a first chemical surface modification on the first surface of the solid state membrane; and
  optionally a second chemical surface modification on the second surface of the solid state membrane; and
contacting the first chemical surface modification with a first ionic solution, and contacting a second surface of the solid-state membrane (or the second chemical surface modification thereon) with a second ionic solution;
applying a first voltage across the solid-state membrane via first and second electrodes in respective contact with the first and second ionic solutions to form one or more apertures through the solid-state membrane and the first (and optionally the second) chemical surface modifications until a stable current leakage is detected; and
applying a second voltage across the solid-state membrane via the first and second electrodes, which second voltage is about 50% to 99% of the first voltage, until a stable current leakage is detected; and
optionally applying a third voltage which is equal to or higher than the first voltage, to homogenise the aperture(s).

In a preferred aspect of this embodiment, the first chemical surface modification contacts a recess in the solid-state membrane, and the recess has an aspect ratio of greater than 1. In another preferred aspect of this embodiment, a current limiting resistor is provided between the first electrode and the solid-state membrane or the second electrode and the solid-state membrane.

In an exemplary embodiment, the substrate comprises a first chemical surface modification and a second chemical surface modification. In such an embodiment, the chemical surface modification (the first chemical surface modification) on the first surface of the solid-state membrane contacts the first ionic solution and the chemical surface modification on the second surface of the solid-state membrane (the second chemical surface modification), contacts the second ionic solution Thus, in a preferred aspect of the process of the invention, the process comprises:
  providing a substrate which comprises
    a solid-state membrane having a first surface and a second surface;
    a first chemical surface modification on the first surface of the solid state membrane; and
    a second chemical surface modification on the second surface of the solid state membrane; and contacting the first chemical surface modification with a first ionic solution, and contacting the second chemical surface modification with a second ionic solution;

applying a first voltage across the solid-state membrane via first and second electrodes in respective contact with the first and second ionic solutions to form one or more apertures through the solid-state membrane and the first and second chemical surface modifications until a stable current leakage is detected; and applying a second voltage across the solid-state membrane via the first and second electrodes, which second voltage is about 50% to 99% of the first voltage, until a stable current leakage is detected; and optionally applying a third voltage which is equal to or higher than the first voltage, to homogenise the aperture(s).

The first ionic solution, the second ionic solution and, if present, any further ionic solutions, may be the same or different. Each ionic solution typically comprises water and ions. A less preferred alternative to an ionic solution is an ionic liquid.

In addition to the ions needed to conduct current and allow the dielectric breakdown step to be performed, the ionic solution(s) may comprise one or more other components. For instance, one or more of the ionic solutions may comprise an analyte. In some embodiments, the first ionic solution and the second ionic solution comprise an analyte; in other embodiments, the first ionic solution comprises an analyte and the second ionic solution does not comprise an analyte. In yet other embodiments, the second ionic solution may comprise an analyte and the first ionic solution may not comprise an analyte.

In some embodiments, one or more of the ionic solutions present may comprise a lipid. It has been found by the inventors that the presence of a lipid in the ionic solutions reduces the likelihood of the aperture becoming clogged when it is generated. Thus, in a preferred embodiment, the first ionic solution and/or the second ionic solution comprises a lipid.

In a particularly preferred embodiment, one or more of the ionic solutions may comprise a chemical surface modification precursor. A chemical surface modification precursor is a species which can interact with a surface of the solid-state membrane in order to form a chemical surface modification. For instance, a chemical surface modification precursor may react with a surface of the solid-state membrane and become covalently bound thereto, in order to provide a chemical surface modification.

It is particularly advantageous to provide a chemical surface modification precursor within an ionic solution for various reasons. Firstly, this permits generation of a chemical surface modification while simultaneously preparing the substrate for generation of an aperture, removing the need for a separate step of generating the chemical surface modification. Secondly, if the aperture is generated by dielectric breakdown and a chemical surface modification precursor is present in an ionic solution which contacts the solid-state membrane during the formation of the aperture, a chemical surface modification may be generated immediately on the internal wall of the aperture.

The inventors have found that, where a "fresh surface" of solid-state membrane is created by the formation of an aperture and a chemical surface modification immediately generated thereon by a chemical precursor in an ionic solution contacting the solid-state membrane, the aperture is less likely to clog. It is speculated that this may be due to the highly reactive fresh surface of the solid-state membrane generated by aperture formation readily reacting with the chemical surface modification and hence generating an aperture having an internal wall with a chemical surface modification thereon. Where the aperture is provided with a chemical surface modification having desirable properties as described herein (for instance, excellent biological compatibility; high hydrophobicity), the aperture may be less susceptible to undesired reactions with the environment and hence clogging.

In a preferred embodiment, therefore, the first ionic solution and/or the second ionic solution comprises a chemical surface modification precursor. Similarly, it is preferred that the process of the invention comprises allowing a chemical surface modification to form immediately on the internal wall of the aperture.

Thus, according to a preferred aspect of the invention the process comprises:— providing a substrate which comprises
  a solid-state membrane having a first surface and a second surface;
  a first chemical surface modification on the first surface of the solid state membrane; and
  optionally a second chemical surface modification on the second surface of the solid state membrane;
contacting the first chemical surface modification with a first ionic solution, and contacting a second surface of the solid-state membrane (or the second chemical surface modification thereon) with a second ionic solution, wherein the first ionic solution and/or the second ionic solution comprise a chemical surface modification precursor; and applying a voltage across the solid-state membrane via first and second electrodes in respective contact with the first and second ionic solutions to form one or more apertures through the solid-state membrane and the first (and optionally the second) chemical surface modifications; and
allowing a chemical surface modification to form immediately on the internal wall of the aperture.

In an exemplary embodiment of the process, the process comprises:
providing a solid-state membrane having a first surface and a second surface;
contacting the first surface of the solid-state membrane with an ionic solution comprising a chemical surface modification precursor, to provide a substrate comprising a solid-state membrane and a first chemical surface modification on the first surface of the substrate;
contacting a second surface of the solid-state membrane (or a second chemical surface modification thereon) with a second ionic solution which may optionally comprise a chemical surface modification precursor;
applying a first voltage across the solid-state membrane via first and second electrodes in respective contact with the first and second ionic solutions to form one or more apertures through the solid-state membrane and the first (and optionally the second) chemical surface modifications until a stable current leakage is detected;
applying a second voltage across the solid-state membrane via the first and second electrodes, which second voltage is about 50% to 99% of the first voltage, until a stable current leakage is detected; and
optionally applying a third voltage which is equal to or higher than the first voltage, to homogenise the aperture(s).

In a preferred aspect of this embodiment, the process comprises allowing a chemical surface modification to form immediately on the internal wall of the aperture.

Chemical Surface Modification Precursor

The chemical surface modification precursor is any species which may generate a chemical surface modification. Typically, the chemical surface modification precursor is a molecule which can become chemically bound to the solid-state membrane (typically to a functionalised surface of the solid-state membrane) in order to generate a chemical surface modification. Preferably, the chemical surface modification precursor is a molecule which can become covalently bound to the solid-state membrane (typically to a functionalised surface of the solid-state membrane) in order to generate a chemical surface modification.

Accordingly, the chemical surface modification precursor corresponds closely to the chemical surface modification described herein. As explained above, it is preferred that the chemical surface modification comprises a plurality of molecules. It is therefore preferred that the chemical surface modification precursor comprises or consists of a plurality of molecules also, which molecules may react with the solid-state membrane (typically a functionalised surface of the solid-state membrane) to generate a chemical surface modification comprising a plurality of molecules.

The chemical surface modification precursor molecules are preferably as described herein in relation to a chemical surface modification. Thus, it is preferred that the chemical surface modification precursor comprises an organic molecule. It is further preferred that the chemical surface modification precursor comprises a hydrophobic moiety. It is particularly preferred that the chemical surface modification precursor comprises an optionally substituted alkyl or alkenyl moiety. The organic molecule, hydrophobic moiety and optionally substitute alkyl or alkenyl moiety are as described herein.

The chemical surface modification precursor can usually react with a surface of the solid-state membrane, or a functionalised surface of the solid-state membrane, to generate to chemical surface modification. A typical reaction mechanism by which the chemical surface modification precursor may react with the surface of the solid state membrane (e.g. a functionalised surface of the solid-state membrane) is a nucleophilic attack reaction. Examples include nucleophilic substitution and esterification. Thus, in a preferred embodiment, the chemical surface modification precursor comprises a molecule comprised in the chemical surface modification, bound to a leaving group. In general, therefore, where the chemical surface modification comprises a plurality of molecules, the molecules have the general formula:

L-E-R wherein:

L is a leaving group;

E is an electrophilic moiety selected from —$CX_2$—; —C(=O)—; —C(=O)O—; —OC(=O)—; —$SO_2$—; —C(=O)—$NR^b$—; —$SiX_2$—; —$SiXOR^b$—; —Si$(OR^b)_2$— or —SiO—, where each X is independently a halogen or cyano group;

R is a $C_{1-50}$ alkyl, $C_{2-50}$ alkenyl or $C_{2-50}$ alkynyl moiety, which may be unsubstituted or substituted by one or more substituents each independently selected from halogen, oxo, cyano, hydroxy, —$OR^a$, $C_{1-10}$ alkyl, $C_{3-10}$ cycloalkyl, $C_{4-10}$ cycloalkenyl, aryl, heteroaryl, heterocycloalkyl, $C_{1-10}$ alkenyl, $C_{1-10}$ alkynyl, —$SR^a$, —$SO_2R^a$, —$SOR^a$, —$SO_2NR^a$, —$S(O)(NR^a)R^a$, —$NR^a_2$, —$NR^aCOR^a$, —$NR^aCO_2R^a$, —$COR^a$, —$CO_2R^a$, and —$CONR^a_2$; and each $R^a$ is independently selected from H, $C_{1-10}$ alkyl, $C_{3-10}$ cycloalkyl, $C_{4-10}$ cycloalkenyl, aryl, heteroaryl, heterocycloalkyl, $C_{1-10}$ alkenyl, and $C_{1-10}$ alkynyl.

The leaving group, L is an electronegative group. Suitable examples of electronegative groups include halogen, hydroxy, cyano, tosylate, mesylate, or triflate; however, as the skilled person will appreciate, alternative leaving groups may be used.

Preferably, R is a $C_{2-25}$ alkyl, $C_{2-25}$ alkenyl or $C_{2-25}$ alkynyl moiety, which may be unsubstituted or substituted by one, two or three substituents independently selected from halogen, oxo, cyano, hydroxy, —$OR^a$, $C_{1-10}$ alkyl, $C_{3-10}$ cycloalkyl, $C_{4-10}$ cycloalkenyl, aryl, heteroaryl, heterocycloalkyl, $C_{1-10}$ alkenyl, $C_{1-10}$ alkynyl, —$SR^a$, —$SO_2R^a$, —$SOR^a$, —$SO_2NR^a$, —$S(O)(NR^a)R^a$, —$NR^a_2$, —$NR^aCOR^a$, —$NR^aCO_2R^a$, —$COR^a$, —$CO_2R^a$, and —$CONR^a_2$.

X is preferably a halogen.

L is preferably a halogen.

In a preferred embodiment, the molecules are derivatives of organosilane molecules. For example, in preferred embodiments the molecules are molecules having the formula L-E-R wherein:

L is a halogen;

E is selected from —$SiX_2$—, —$SiXOR^b$—; —Si$(OR^b)_2$— or —SiO—, where each X is independently a halogen or cyano group; and R is a $C_{2-25}$ alkyl or $C_{2-25}$ alkenyl group, which may be optionally substituted by one, two or three substituents selected from one, two or three substituents independently selected from halogen, oxo, cyano, hydroxy, —$OR^a$, $C_{1-10}$ alkyl, $C_{3-10}$ cycloalkyl, $C_{4-10}$ cycloalkenyl, aryl, heteroaryl, heterocycloalkyl, $C_{1-10}$ alkenyl, $C_{1-10}$ alkynyl, —$SR^a$, —$SO_2R^a$, —$SOR^a$, —$SO_2NR^a$, —$S(O)(NR^a)R^a$, —$NR^a_2$, —$NR^aCOR^a$, —$NR^aCO_2R^a$, —$COR^a$, —$CO_2R^a$, and —$CONR^a_2$.

In a further preferred embodiment, the molecules are molecules having the formula L-E-R wherein:

L is a halogen;

E is —$SiX_2$— and each X is a halogen atom, preferably a chlorine atom; and

R is an unsubstituted $C_{2-25}$ alkyl or $C_{2-25}$ alkenyl group.

In a particularly preferred embodiment, the chemical surface modification precursor comprises an organosilane. Preferably, the chemical surface modification precursor is an organosilane, preferably octadecyltrichlorosilane.

Layer of Amphipathic Molecules

A layer of amphipathic molecules may be disposed across the aperture provided in the substrate. Where the substrate comprises more than one aperture, a layer of amphipathic molecules may be disposed across one or more of the apertures, for instance across all of the apertures. As explained above, a layer of amphipathic molecules may be desirable as it provides a charge seal to prevent flow of liquid (and charge) across the solid-state membrane through the aperture, and also a layer into which a biomolecular pore may be inserted.

Thus, in a preferred aspect of the process of the invention, the process comprises disposing a layer of amphipathic molecules across the aperture. For instance, the process may comprise providing a substrate which comprises a solid-state membrane and a first chemical surface modification on a first surface of the solid state membrane;

forming an aperture through the first chemical surface modification and the solid-state membrane; and disposing a layer of amphipathic molecules across the aperture.

In a particularly preferred embodiment of the invention, the process comprises:
providing a substrate which comprises
a solid-state membrane having a first surface and a second surface;
a first chemical surface modification on the first surface of the solid state membrane; and
optionally a second chemical surface modification on the second surface of the solid state membrane;
contacting the first chemical surface modification with a first ionic solution, and contacting a second surface of the solid-state membrane (or the second chemical surface modification thereon) with a second ionic solution; and applying a voltage across the solid-state membrane via first and second electrodes in respective contact with the first and second ionic solutions to form one or more apertures through the solid-state membrane and the first (and optionally the second) chemical surface modifications; and
disposing a layer of amphipathic molecules across the aperture.

The layer of amphipathic molecules may also be referred to as a membrane. It should also be noted that, in the art, amphipathic molecules may also be referred to as amphiphilic molecules or amphiphiles.

Suitable amphipathic molecules are well-known to the skilled person. Amphipathic molecules are molecules such as phospholipids, which have both hydrophilic and lipophilic properties. The amphipathic molecules may be synthetic or naturally occurring.

In one example, the amphipathic molecules may comprise a lipid, which may have a single component or a mixture of components, as is conventional when forming lipid bilayers. Any lipids that form a membrane such as a lipid bilayer may be used. Phospholipids may be employed. The lipids are chosen such that a lipid bilayer having the required properties, such as surface charge, ability to support membrane proteins, packing density or mechanical properties, is formed. The lipids can comprise one or more different lipids. For instance, the lipids can contain up to 100 lipids. The lipids preferably contain 1 to 10 lipids. The lipids may comprise naturally-occurring lipids and/or artificial lipids. The lipids can also be chemically-modified.

Lipids typically comprise a head group, an interfacial moiety and two hydrophobic tail groups which may be the same or different. Suitable head groups include, but are not limited to, neutral head groups, such as diacylglycerides (DG) and ceramides (CM); zwitterionic head groups, such as phosphatidylcholine (PC), phosphatidylethanolamine (PE) and sphingomyelin (SM); negatively charged head groups, such as phosphatidylglycerol (PG); phosphatidylserine (PS), phosphatidylinositol (PI), phosphatic acid (PA) and cardiolipin (CA); and positively charged headgroups, such as trimethylammonium-Propane (TAP). Suitable interfacial moieties include, but are not limited to, naturally-occurring interfacial moieties, such as glycerol-based or ceramide-based moieties. Suitable hydrophobic tail groups include, but are not limited to, saturated hydrocarbon chains, such as lauric acid (n-Dodecanolic acid), myristic acid (n-Tetradeconoic acid), palmitic acid (n-Hexadecanoic acid), stearic acid (n-Octadecanoic) and arachidic (n-Eicosanoic); unsaturated hydrocarbon chains, such as oleic acid (cis-9-Octadecanoic); and branched hydrocarbon chains, such as phytanoyl. The length of the chain and the position and number of the double bonds in the unsaturated hydrocarbon chains can vary. The length of the chains and the position and number of the branches, such as methyl groups, in the branched hydrocarbon chains can vary. The hydrophobic tail groups can be linked to the interfacial moiety as an ether or an ester. The lipids may be mycolic acid.

The lipids can also be chemically-modified. The head group or the tail group of the lipids may be chemically-modified. Suitable lipids whose head groups have been chemically-modified include, but are not limited to, PEG-modified lipids, such as 1,2-Diacyl-sn-Glycero-3-Phosphoethanolamine-N-[Methoxy(Polyethylene glycol)-2000]; functionalised PEG Lipids, such as 1,2-Distearoyl-sn-Glycero-3 Phosphoethanolamine-N-[Biotinyl(Polyethylene Glycol)2000]; and lipids modified for conjugation, such as 1,2-Dioleoyl-sn-Glycero-3-Phosphoethanolamine-N-(succinyl) and 1,2-Dipalmitoyl-sn-Glycero-3-Phosphoethanolamine-N-(Biotinyl). Suitable lipids whose tail groups have been chemically-modified include, but are not limited to, polymerisable lipids, such as 1,2-bis(10,12-tricosadiynoyl)-sn-Glycero-3-Phosphocholine; fluorinated lipids, such as 1-Palmitoyl-2-(16-Fluoropalmitoyl)-sn-Glycero-3-Phosphocholine; deuterated lipids, such as 1,2-Dipalmitoyl-D62-sn-Glycero-3-Phosphocholine; and ether linked lipids, such as 1,2-Di-O-phytanyl-sn-Glycero-3-Phosphocholine.

Thus, in a preferred embodiment, the amphipathic molecules comprise lipid molecules, preferably phospholipid molecules. Particularly preferred examples of lipid molecules which may be used in the layer of amphipathic molecules are DPhPC or TBCP. Thus, in a preferred embodiment, the amphipathic molecules comprise one or more of DPhPC or TBCP. For instance, where the substrate comprises a layer of amphipathic molecules or the process comprises disposing a layer of amphipathic molecules across an aperture, it is preferred that the layer of amphipathic molecules comprises one or more of DPhPC or TBCP. In a particularly preferred embodiment, the layer of amphipathic molecules consists of DPhPC and/or TBCP.

Amphipathic molecules other than lipids may be used. A class of molecules other than lipids which may be included in the amphipathic molecules is block copolymers (Gonzalez-Perez et al., Langmuir, 2009, 25, 10447-10450). Block copolymers are polymeric materials in which two or more monomer sub-units that are polymerized together to create a single polymer chain. Block copolymers typically have properties that are contributed by each monomer sub-unit. However, a block copolymer may have unique properties that polymers formed from the individual sub-units do not possess. Block copolymers can be engineered such that one of the monomer sub-units is hydrophobic (i.e. lipophilic), whilst the other sub-unit(s) are hydrophilic whilst in aqueous media. In this case, the block copolymer may possess amphiphilic properties and may form a structure that mimics a biological membrane. The block copolymer may be a diblock (consisting of two monomer sub-units), but may also be constructed from more than two monomer sub-units to form more complex arrangements that behave as amphipiles. The copolymer may be a triblock, tetrablock or pentablock copolymer. The membrane is preferably a triblock copolymer membrane.

Examples of triblock copolymers are amphiphathic compounds comprising a first outer hydrophilic group, a hydrophobic core group, and a second outer hydrophilic group, wherein each of the first and second outer hydrophilic groups is linked to the hydrophobic core group. Some such amphipathic compounds are disclosed in WO 2014/064444, the entire contents of which are incorporated herein by reference.

Archaebacterial bipolar tetraether lipids are naturally occurring lipids that are constructed such that the lipid forms a monolayer membrane. These lipids are generally found in extremophiles that survive in harsh biological environments, thermophiles, halophiles and acidophiles. Their stability is believed to derive from the fused nature of the final bilayer. It is straightforward to construct block copolymer materials that mimic these biological entities by creating a triblock polymer that has the general motif hydrophilic-hydrophobic-hydrophilic. This material may form monomeric membranes that behave similarly to lipid bilayers and encompass a range of phase behaviours from vesicles through to laminar membranes. Membranes formed from these triblock copolymers hold several advantages over biological lipid membranes. Because the triblock copolymer is synthesised, the exact construction can be carefully controlled to provide the correct chain lengths and properties required to form membranes and to interact with pores and other proteins.

Block copolymers may also be constructed from sub-units that are not classed as lipid sub-materials; for example a hydrophobic polymer may be made from siloxane or other non-hydrocarbon based monomers. The hydrophilic sub-section of block copolymer can also possess low protein binding properties, which allows the creation of a membrane that is highly resistant when exposed to raw biological samples. This head group unit may also be derived from non-classical lipid head-groups.

Triblock copolymer membranes also have increased mechanical and environmental stability compared with biological lipid membranes, for example a much higher operational temperature or pH range. The synthetic nature of the block copolymers provides a platform to customise polymer based membranes for a wide range of applications.

In some embodiments, the layer of amphipathic molecules is one of the membranes disclosed in International Application No. WO2014/064443 or WO2014/064444, the entire contents of which are incorporated herein by reference.

A layer of amphipathic molecules may comprise one or more additives that will affect the properties of the layer. Suitable additives include, but are not limited to, fatty acids, such as palmitic acid, myristic acid and oleic acid; fatty alcohols, such as palmitic alcohol, myristic alcohol and oleic alcohol; sterols, such as cholesterol, ergosterol, lanosterol, sitosterol and stigmasterol; lysophospholipids, such as 1-Acyl-2-Hydroxy-sn-Glycero-3-Phosphocholine; and ceramides.

Typically, the chemical surface modification(s) present on the solid-state membrane are better-able to support a layer of amphipathic molecules than the solid-state membrane itself. For instance, the chemical surface modification (or one of the chemical surface modifications) may be hydrophobic, and may therefore be able to support a layer of amphipathic molecules arranged such that their hydrophobic moieties contact the solid-state membrane. Alternatively, or additionally, the chemical surface modification (or one of the chemical surface modifications) may be hydrophilic, and may therefore be able to support a layer of amphipathic molecules arranged such that their hydrophilic moieties contact the solid-state membrane.

The layer of amphipathic molecules comprises one or more layers. For instance, the layer of amphipathic molecules may be a monolayer. In an alternative embodiment the layer of amphipathic molecules may be a bilayer. Accordingly, in some embodiments the substrate of the invention comprises a monolayer of amphipathic molecules, while in other embodiments the substrate of the invention comprises a bilayer of amphipathic molecules. Similarly, some embodiments of the process of the invention comprise disposing a monolayer of amphipathic molecules across the aperture. Other embodiments of the process of the invention comprise disposing a bilayer of amphipathic molecules across the aperture. Where a bilayer is disposed across the aperture, the bilayer may be formed either by the meeting of two monolayers disposed either side of the solid-state membrane, or by a bilayer disposed on one side of the solid-state membrane. This is discussed in more detail below.

The chemical surface modification or modifications disposed on the solid-state membrane permit the solid-state membrane to support more than one layer of amphipathic molecules. Each layer of amphipathic molecules may have the same composition or a different composition; preferably, each layer of amphipathic molecules comprises the same amphipathic molecules.

As explained above, the substrate comprises a first surface having a first chemical surface modification thereon, and an aperture extends from the first surface to a second surface of the solid-state membrane. A first layer of amphipathic molecules may be disposed on the first chemical surface modification, spanning the aperture. Where the first layer of amphipathic molecules is a monolayer, the monolayer of amphipathic molecules may be disposed across the aperture. However, where the first layer of amphipathic molecules is a bilayer, a bilayer of amphipathic molecules will be disposed across the aperture.

Figure 4:
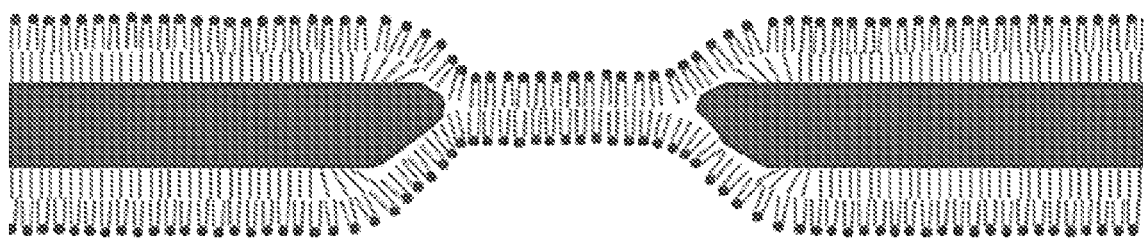
FIG. 4 is a diagram showing, in cross-section, a substrate having a chemical surface modification on each of its two opposing surfaces and an aperture extending between those surfaces, with a monolayer of amphipathic molecules disposed on each of the two chemically-modified surfaces. The monolayers of amphipathic molecules meet across the aperture to form a bilayer of amphipathic molecules disposed across the aperture.

A second layer of amphipathic molecules may be disposed on the second surface of the chemical surface modification. More typically, where a second layer of amphipathic molecules is present, the second surface of the solid-state membrane may have a second chemical modification thereon and the second layer of amphipathic molecules is disposed on the second chemical surface modification. The second layer of amphipathic molecules may be a monolayer or a bilayer. The second layer of amphipathic molecules, like the first layer of amphipathic molecules, will be disposed across the aperture.

Where a first layer of amphipathic molecules and a second layer of amphipathic molecules are present and span the aperture, they will contact one another at the aperture. Thus, where a first monolayer of amphipathic molecules is present on a first chemical surface modification and a second monolayer of amphipathic molecules is present on a second chemical surface modification, the first and second monolayers of amphipathic molecules will meet at the aperture and form a bilayer of amphipathic molecules disposed across the aperture. This arrangement is illustrated diagrammatically in FIG. 4. The first monolayer of amphipathic molecules and the second layer of amphipathic molecules may have the same or different compositions; preferably, they have the same composition.

This arrangement is particularly favoured with the process and substrate of the invention, because the process can produce—and the substrate can comprise—very small apertures. With larger apertures, there is a tendency for the layers of amphipathic molecules to break and, rather than forming a monolayer or bilayer spanning the aperture, they may become distributed along the internal wall of the aperture instead and fail to form a seal across the aperture. The process and substrates of the invention promote the formation of a stable layer of amphipathic molecules spanning the aperture.

The process of the invention can produce a substrate comprising more than one aperture. Similarly, the substrate of the invention may comprise more than one aperture. Where a substrate comprises more than one aperture, each aperture may independently have a layer of amphipathic molecules disposed across the aperture (for instance a monolayer or a bilayer of amphipathic molecules), or no layer of amphipathic molecules at all.

In a preferred embodiment, the process of the invention comprises
providing a substrate which comprises
a solid-state membrane having a first surface and a second surface and a first chemical surface modification on the first surface of the solid state membrane;
contacting the first chemical surface modification with a first ionic solution, and contacting a second surface of the solid-state membrane (or s second chemical surface modification thereon) with a second ionic solution; and
applying a voltage across the solid-state membrane via first and second electrodes in respective contact with the first and second ionic solutions to form one or more apertures through the solid-state membrane and the first (and optionally the second) chemical surface modifications; and
disposing a first layer of amphipathic molecules on the chemical surface modification on the first surface of the solid-state membrane and across the aperture.

In a preferred aspect of this embodiment, the process further comprises disposing a second layer of amphipathic molecules on a second surface of the solid-state membrane, or on a second chemical surface modification on the second surface of the solid-state membrane, and across the aperture. Preferably, the process comprises disposing the second layer of amphipathic molecules on a second chemical surface modification disposed on the second surface of the solid-state membrane, and across the aperture. In a preferred aspect of this embodiment, the first layer of amphipathic molecules and the second layer of amphipathic molecules meet at the aperture, for example forming a bilayer across the aperture.

It is not always necessary to take active steps to generate one or more layers of amphipathic molecules (particularly lipid monolayers or lipid bilayers). A key advantage of the chemical surface modification is that it is capable of providing a surface which promotes the self-assembly of lipid molecules (for instance, a hydrophilic surface or more usually a hydrophobic surface). Thus, in some embodiments of the process of the invention, the aperture is generated in the presence of amphipathic molecules (e.g. lipid molecules). For instance, the first and/or second ionic solutions may comprise amphipathic molecules (e.g. lipid molecules). Once the aperture is generated, amphipathic molecules (e.g. lipid molecules) may spontaneously assemble to generate one or more layers of amphipathic molecules spanning the aperture.

Alternatively, the or each layer of amphipathic molecules may be generated by methods known in the art. By way of example, exemplary methods are described below.

Lipid bilayers are commonly formed by the method of Montal and Mueller (Proc. Natl. Acad. Sci. USA., 1972; 69: 3561-3566), in which a lipid monolayer is carried on aqueous solution/air interface past either side of an aperture which is perpendicular to that interface. The lipid is normally added to the surface of an aqueous electrolyte solution by first dissolving it in an organic solvent and then allowing a drop of the solvent to evaporate on the surface of the aqueous solution on either side of the aperture. Once the organic solvent has evaporated, the solution/air interfaces on either side of the aperture are physically moved up and down past the aperture until a bilayer is formed. Planar lipid bilayers may be formed across an aperture in a membrane or across an opening into a recess.

The method of Montal & Mueller is popular because it is a cost-effective and relatively straightforward method of forming good quality lipid bilayers that are suitable for protein pore insertion. Other common methods of bilayer formation include tip-dipping, painting bilayers and patch-clamping of liposome bilayers.

Tip-dipping bilayer formation entails touching the aperture surface (for example, a pipette tip) onto the surface of a test solution that is carrying a monolayer of lipid. Again, the lipid monolayer is first generated at the solution/air interface by allowing a drop of lipid dissolved in organic solvent to evaporate at the solution surface. The bilayer is then formed by the Langmuir-Schaefer process and requires mechanical automation to move the aperture relative to the solution surface.

For painted bilayers, a drop of lipid dissolved in organic solvent is applied directly to the aperture, which is submerged in an aqueous test solution. The lipid solution is spread thinly over the aperture using a paintbrush or an equivalent. Thinning of the solvent results in formation of a lipid bilayer. However, complete removal of the solvent from the bilayer is difficult and consequently the bilayer formed by this method is less stable and more prone to noise during electrochemical measurement.

Patch-clamping is commonly used in the study of biological cell membranes. The cell membrane is clamped to the end of a pipette by suction and a patch of the membrane becomes attached over the aperture. The method has been adapted for producing lipid bilayers by clamping liposomes which then burst to leave a lipid bilayer sealing over the aperture of the pipette. The method requires stable, giant and unilamellar liposomes and the fabrication of small apertures in materials having a glass surface.

When applied to the process of the invention, the above methods can generate a bilayer of amphipathic molecules (generally a lipid bilayer) spanning one or more apertures. However, the method will typically generate a monolayer of amphipathic molecules (typically a monlayer of lipid molecules) disposed on the surrounding substrate (i.e. the surfaces of the solid-state membrane or on the chemical surface modification(s) disposed thereon).

Accordingly, in an exemplary process of the invention, the process comprises
providing a substrate which comprises a solid-state membrane having a first surface with a first chemical surface modification thereon, and a second surface with a second chemical surface modification thereon;
forming an aperture through the first and second chemical surface modifications and the solid-state membrane; and
disposing a lipid bilayer across the aperture.

In a preferred aspect of this embodiment, the step of disposing a lipid bilayer across the aperture comprises
disposing a layer of lipid molecules on the first chemical surface modification and a layer of lipid molecules on the second chemical surface modification, which meet at the aperture to form a lipid bilayer.

Preferably, the step of disposing a lipid bilayer across the aperture is performed using the method of Montal and Mueller.

Thus, in a preferred embodiment, the process of the invention comprises
- providing a substrate which comprises a solid-state membrane having a first surface and a second surface and a first chemical surface modification on the first surface of the solid state membrane;
- contacting the first chemical surface modification with a first ionic solution, and contacting the second chemical surface modification with a second ionic solution; and applying a voltage across the solid-state membrane via first and second electrodes in respective contact with the first and second ionic solutions to form one or more apertures through the solid-state membrane and the first and second chemical surface modifications; and
- disposing a layer of lipid molecules on the first chemical surface modification and a layer of lipid molecules on the second chemical surface modification, which meet at the aperture to form a lipid bilayer.

In some embodiments, a layer of amphipathic molecules is formed spontaneously. For instance, the process of the invention may comprise:
- providing a substrate which comprises a solid-state membrane having a first surface and a second surface, with a first chemical surface modification on the first surface of the solid state membrane and optionally a second chemical surface modification on the second surface of the solid state membrane;
- contacting the first chemical surface modification with a first ionic solution, and contacting the second chemical surface modification with a second ionic solution, wherein the first ionic solution and optionally also the second ionic solution comprises amphipathic molecules; and applying a voltage across the solid-state membrane via first and second electrodes in respective contact with the first and second ionic solutions to form one or more apertures through the solid-state membrane and the first and optionally second chemical surface modifications; and
- allowing amphipathic molecules to form a first layer disposed on the first chemical surface modification; and where the second ionic solution comprises amphipathic molecules, also allowing amphipathic molecules to assemble and form a second layer of amphipathic molecules disposed on the second surface or on the second chemical surface modification, which meets the first layer of amphipathic molecules at the aperture to form a bilayer of amphipathic molecules.

Preferably the first and second layers of amphipathic molecules are monolayers. Preferably the amphipathic molecules are lipid molecules.

It is also possible to dispose a layer of amphipathic molecules upon a surface of the solid-state membrane, or a chemical surface modification thereon, before an aperture is formed thereon. In that case, however, once the aperture is generated the disposal of amphipathic molecules may need to be performed again in order to provide a layer of amphipathic molecules across the aperture. It should be noted that, in cases where a layer of amphipathic molecules is disposed on a surface of the solid-state membrane, or a chemical surface modification thereon, the first and second ionic solutions do not contact the respective surface or chemical surface modification directly but do so via a layer of amphipathic molecules.

Inclusion of a Biomolecular Pore

In some embodiments, the process of the invention is a process for producing a hybrid nanopore. Similarly, in some embodiments the substrates of the invention comprise a hybrid nanopore. A hybrid nanopore comprises a solid-state nanopore (that is, a solid-state membrane having an aperture therein), together with a biomolecular pore. Optionally, a hybrid nanopore may also comprise one or more layers of amphipathic molecules disposed across the aperture, into which the biomolecular pore may be inserted.

Figure 5:
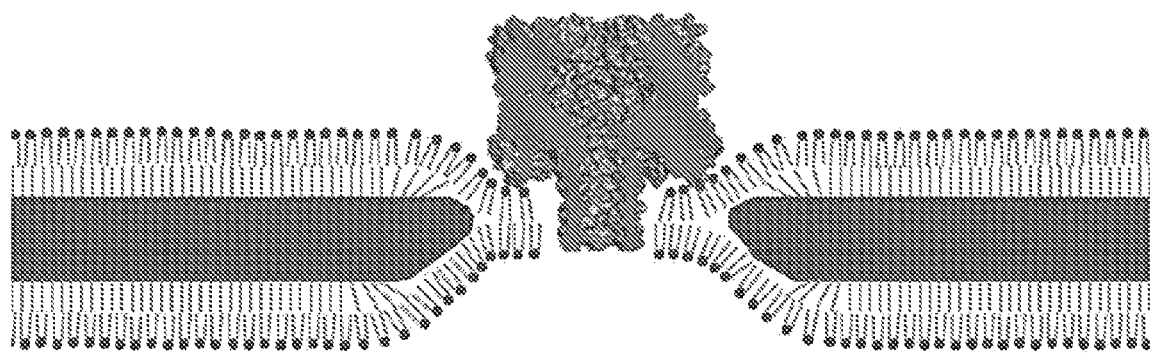
FIG. 5 is a diagram illustrating the same cross-section as in FIG. 4, wherein a pore is inserted in the bilayer of amphipathic molecules disposed across the aperture and a polymer is present within the pore.

Thus, in a preferred embodiment, the process of the invention comprises inserting a biomolecular pore into the aperture. By "inserting a biomolecular pore into the aperture" is meant that at least a part of the biomolecular pore is inserted into the aperture. The biomolecular pore need not protrude from one side of the solid-state membrane to another (i.e. it need not span the whole distance from the first surface to the second surface of the solid-state membrane). It may sit partially within the aperture, typically inserted within a layer of amphipathic molecules. This arrangement is illustrated in FIG. 5.

The process of the invention is capable of producing particularly small apertures. For instance, the process of the invention can produce apertures which are less than 20 nm in diameter, for instance less than 10 nm in diameter, even less than 5 nm or less than 4 nm in diameter. At such small sizes, the aperture(s) have a diameter which is similar to or less than the diameter of most biomolecular pores. Although the aperture may be smaller than the diameter of a biomolecular pore, a part of the biomolecular pore can still insert into the aperture. Thus, a larger biomolecular pore can insert into the aperture. However, the area adjacent to the aperture will then be fully occupied by the biomolecular pore. Thus, steric effects will prevent more than one biomolecular pore from becoming inserted into each aperture.

Thus, in a preferred embodiment, the process comprises inserting no more than one biomolecular pore into the aperture. In similarly preferred embodiments, the substrates of the invention may comprise no more than one biomolecular pore inserted into the or each aperture.

Insertion of no more than one biomolecular into each aperture is highly advantageous in sensing applications. Where a hybrid pore is used to characterise an analyte by detecting variations in electric current across the solid-state membrane as the analyte passes across the pore, complications arise where more than one pore is present. That is because the electrical signal detected will be a composite signal derived from the current flowing through each pore. It is therefore highly desirable to remove this complication and provide hybrid pores which contain no more than one biomolecular pore.

The nature of the biomolecular pore is not particularly limited. In one embodiment, the biomolecular pore is a transmembrane pore.

A transmembrane pore is a structure that crosses the membrane to some degree. It permits hydrated ions driven by an applied potential to flow across or within the membrane. The transmembrane pore typically crosses the entire membrane so that hydrated ions may flow from one side of the membrane to the other side of the membrane. However, the transmembrane pore does not have to cross the membrane. It may be closed at one end. For instance, the pore may be a well, gap, channel, trench or slit in the membrane along which or into which hydrated ions may flow. Any transmembrane pore may be used in the methods provided herein.

The biomolecular pore may be biological or artificial. Suitable biomolecular pores include, but are not limited to protein pores and polynucleotide pores. The pore may be a DNA origami pore (Langecker et al., Science, 2012; 338: 932-936). Suitable DNA origami pores are disclosed in WO2013/083983 and WO 2018/011603, the contents of which are incorporated by reference.

In one embodiment, the nanopore is a transmembrane protein pore. A transmembrane protein pore is a polypeptide or a collection of polypeptides that permits hydrated ions, such as polynucleotide or polypeptide, to flow from one side of a membrane to the other side of the membrane. In the methods provided herein, the transmembrane protein pore is capable of forming a pore that permits hydrated ions driven by an applied potential to flow from one side of the membrane to the other. The transmembrane protein pore preferably permits polynucleotides or polypeptides to flow from one side of the membrane, such as a triblock copolymer membrane, to the other. The transmembrane protein pore allows a polynucleotide or polypeptide to be moved through the pore.

In one embodiment, the biomolecular pore is a transmembrane protein pore which is a monomer or an oligomer. The pore is preferably made up of several repeating subunits, such as at least 6, at least 7, at least 8, at least 9, at least 10, at least 11, at least 12, at least 13, at least 14, at least 15, or at least 16 subunits. The biomolecular pore is preferably a hexameric, heptameric, octameric or nonameric pore. The biomolecular pore may be a homo-oligomer or a hetero-oligomer.

In one embodiment, the biomolecular pore may be a transmembrane protein pore comprises a barrel or channel through which the ions may flow. The subunits of such a pore typically surround a central axis and contribute strands to a transmembrane β-barrel or channel or a transmembrane α-helix bundle or channel.

Typically, the barrel or channel of the transmembrane protein pore comprises amino acids that facilitate interaction with an analyte, such as a target polynucleotide (as described herein). These amino acids are preferably located near a constriction of the barrel or channel. The transmembrane protein pore typically comprises one or more positively charged amino acids, such as arginine, lysine or histidine, or aromatic amino acids, such as tyrosine or tryptophan. These amino acids typically facilitate the interaction between the pore and nucleotides, polynucleotides or nucleic acids.

In one embodiment, the biomolecular pore is a transmembrane protein pore derived from β-barrel pores or α-helix bundle pores. β-barrel pores comprise a barrel or channel that is formed from β-strands. Suitable β-barrel pores include, but are not limited to, β-toxins, such as α-hemolysin, anthrax toxin and leukocidins, and outer membrane proteins/porins of bacteria, such as *Mycobacterium smegmatis* porin (Msp), for example MspA, MspB, MspC or MspD, CsgG, outer membrane porin F (OmpF), outer membrane porin G (OmpG), outer membrane phospholipase A and *Neisseria* autotransporter lipoprotein (NalP) and other pores, such as lysenin. α-helix bundle pores comprise a barrel or channel that is formed from α-helices. Suitable α-helix bundle pores include, but are not limited to, inner membrane proteins and a outer membrane proteins, such as WZA and ClyA toxin.

In one embodiment the biomolecular pore is a transmembrane pore derived from or based on Msp, α-hemolysin (α-HL), lysenin, CsgG, ClyA, Spl or haemolytic protein fragaceatoxin C (FraC).

In one embodiment, the biomolecular pore is a transmembrane protein pore derived from CsgG, e.g. from CsgG from *E. coli* Str. K-12 substr. MC4100. Such a pore is oligomeric and typically comprises 7, 8, 9 or 10 monomers derived from CsgG. The pore may be a homo-oligomeric pore derived from CsgG comprising identical monomers. Alternatively, the pore may be a hetero-oligomeric pore derived from CsgG comprising at least one monomer that differs from the others. Examples of suitable pores derived from CsgG are disclosed in WO 2016/034591 and WO 2019/002893.

In one embodiment, the biomolecular pore is a transmembrane pore derived from lysenin. Examples of suitable pores derived from lysenin are disclosed in WO 2013/153359.

In one embodiment, the biomolecular pore is a transmembrane pore derived from or based on α-hemolysin (α-HL). The wild type α-hemolysin pore is formed of 7 identical monomers or sub-units (i.e., it is heptameric). An α-hemolysin pore may be α-hemolysin-NN or a variant thereof. The variant preferably comprises N residues at positions E111 and K147.

In one embodiment, the biomolecular pore is a transmembrane protein pore derived from Msp, e.g. from MspA. Examples of suitable pores derived from MspA are disclosed in WO 2012/107778.

In one embodiment, the biomolecular pore is a transmembrane pore derived from or based on ClyA.

Preferably, the biomolecular pore comprises a protein nanopore. Further preferably, the protein nanopore comprises cytolysin A (ClyA), Phi29 portal protein, CsgG, alpha-Hemolysin, *Mycobacterium smegmatis* porin A (MspA), Lysenin, aerolysin, cytotoxin K (cytk), (FraC) or actinoporin fragaceatoxin C. Accordingly in a preferred aspect, the process of the invention comprises inserting a protein nanopore into the aperture, preferably wherein the protein nanopore comprises one or more of cytolysin A (ClyA), Phi29 portal protein, CsgG, alpha-Hemolysin, *Mycobacterium smegmatis* porin A (MspA), Lysenin, aerolysin, cytotoxin K (cytk), (FraC) or actinoporin fragaceatoxin C.

Where the process of the invention is a process of generating a hybrid nanopore, the process typically comprises:
  providing a substrate which comprises a solid-state membrane and a first chemical surface modification on a first surface of the solid-state membrane;
  forming an aperture through the first chemical surface modification and the solid-state membrane;
  disposing a layer of amphipathic molecules across the aperture; and
  inserting a biomolecular pore into the layer of amphipathic molecules.

In such a method, the step of forming an aperture and the step of disposing a layer of amphipathic molecules may be performed simultaneously. For instance, a layer of amphipathic molecules may be disposed on the solid state membrane or more usually on a first chemical surface modification on a first surface of the solid-state membrane. An aperture may then be formed through the first chemical surface modification and the solid-state membrane with a layer of amphipathic molecules disposed across the aperture. Even if formation of the aperture initially disrupts the layer of amphipathic molecules at the position of the aperture, while the aperture forms, or shortly afterwards, the amphipathic molecules may self-assemble to form a layer of amphipathic molecules disposed across the aperture.

As explained above, the step of disposing a layer of amphipathic molecules across the aperture may not require active steps. Where the aperture is generated in the presence of a lipid, the step of disposing a layer of amphipathic molecules across the aperture may comprise simply allowing the amphipathic molecules to assemble into a layer across the aperture.

Methods of inserting a biomolecular pore into a layer of amphipathic molecules (e.g. a lipid bilayer) are known in the art, and such methods may be used in the above process. For instance, the step of inserting a biomolecular pore into the layer of amphipathic molecules comprises applying a voltage across the layer of amphipathic molecules. Methods of inserting transmembrane pores such as biomolecular pores into membranes are described in WO 2018/096348, which is incorporated by reference herein in its entirety.

Accordingly, the process of the invention typically comprises:
  providing a substrate which comprises
    a solid-state membrane having a first surface and a second surface;
    a first chemical surface modification on the first surface of the solid state membrane; and
    optionally a second chemical surface modification on the second surface of the solid state membrane;
  contacting the first chemical surface modification with a first ionic solution, and contacting a second surface of the solid-state membrane (or the second chemical surface modification thereon) with a second ionic solution; and applying a voltage across the solid-state membrane via first and second electrodes in respective contact with the first and second ionic solutions to form one or more apertures through the solid-state membrane and the first (and optionally the second) chemical surface modifications;
  disposing a first layer of amphipathic molecules spanning the aperture on the first chemical surface modification and, where a second chemical surface modification is present, optionally disposing a second layer of amphipathic molecules spanning the aperture on the second chemical surface modification, which meets the first layer of amphipathic molecules at the aperture to form a bilayer; and
  providing a biomolecular pore in the first ionic solution and applying a voltage across the solid-state membrane to insert the biomolecular pore into the first layer of amphipathic molecules (or where present the bilayer).

The biomolecular pore may of course be present in the first ionic solution initially; it need not be added later.

In a preferred aspect of this process, the chemical surface modification(s) are formed by depositing a chemical surface precursor present in the first (and optionally second) ionic solutions. Thus, in a preferred aspect, the process of the invention comprises comprises:
  providing a substrate which comprises
    a solid-state membrane having a first surface and a second surface;
  contacting the first surface with a first ionic solution which comprises a first chemical surface modification precursor, and allowing a first chemical surface modification to form on the first surface;
  sequentially or simultaneously contacting a second surface of the solid-state with a second ionic solution which may optionally comprise a second chemical surface modification precursor, and optionally allowing a second chemical surface modification to form on the second surface;
  applying a voltage across the solid-state membrane via first and second electrodes in respective contact with the first and second ionic solutions to form one or more apertures through the solid-state membrane and the first (and optionally the second) chemical surface modifications;
  disposing a first layer of amphipathic molecules spanning the aperture on the first chemical surface modification and, where a second chemical surface modification is present, optionally disposing a second layer of amphipathic molecules spanning the aperture on the second chemical surface modification, which meets the first layer of amphipathic molecules at the aperture to form a bilayer; and
  providing a biomolecular pore in the first ionic solution and applying a voltage across the solid-state membrane to insert the biomolecular pore into the first layer of amphipathic molecules (or where present the bilayer).

Preliminary Process Steps

The process of the invention may comprise a number of additional preliminary process steps. For instance, the process of the invention may comprise a preliminary step of forming a first chemical surface modification on a first surface of the solid-state membrane. The process may additionally comprise forming a second chemical surface modification on a second surface of the solid-state membrane.

A typical process of forming a chemical surface modification is to contact the surface (which may be functionalised) with a chemical surface modification precursor. The means by which the surface and the chemical surface precursor may be contacted are not particularly limited. The chemical surface precursor may be in the gas phase or in the solution phase. Conveniently, the step of forming a chemical surface modification on a surface of the solid-state membrane may comprise contacting the relevant surface of the solid-state membrane with an ionic solution comprising a chemical surface modification precursor.

The ionic solution may of course be one of the ionic solutions which contacts an electrode and which is used to generate an aperture during a dielectric breakdown process, as described above.

The or each chemical surface modification precursor(s) is as described herein.

Usually, the process of the invention comprises functionalising a surface of the solid-state membrane, so as to permit it to react with a chemical surface modification precursor and thus form a chemical surface modification. Accordingly, in a preferred embodiment, the process may comprise functionalising the first surface of the solid state membrane prior to contacting the first surface of the solid state membrane with the first ionic solution comprising a first chemical surface modification precursor. Optionally, the process may also comprise functionalising the second surface of the solid state membrane prior to contacting said second surface with a second ionic solution comprising a second chemical surface modification precursor.

The step of functionalising a surface of the solid-state membrane may comprise providing reactive moieties on the said surface. For instance, the step of functionalising the surface may comprise providing nucleophilic moieties on the said surface. Typical nucleophilic moieties include carboxyl groups, hydroxy groups, thiol groups or amine groups. Exemplary amine groups may include —$NH_2$, $NHR^c$ or $NR^c_2$ groups, and exemplary thiol groups may include —SH or —$SR^c$ groups, where $R^c$ is an alkyl, alkenyl or alkynyl moiety. Exemplary $R^c$ groups may include $C_{1-6}$ alkyl, $C_{2-6}$ alkenyl and $C_{2-6}$ alkynyl.

Functionalising the surface may therefore comprise contacting the said surface with a species comprising a nucleophilic moiety. For instance, functionalising the surface may comprise contacting the surface with one or more of $H_2O$, $HOR^c$, $NH_3$, $NH_2R^c$, $NHR^c_2$, $NR^c_3$, $H_2S$, $HSR^c$, and $SR^c_2$. Functionalising the surface may comprise contacting the surface with one or more of $H_2O$, $HOR^c$, $NH_3$, $NH_2R^c$, $NHR^c{}_2$, $NR^c{}_3$, $H_2S$, $HSR^c$, and $SR^c{}_2$ in liquid form or gaseous form.

Preferably, functionalising the surface may comprise contacting the said surface with $H_2O$, ammonia or an amine. A suitable example of an amine is 3-aminopropyltrimethoxysilane. Further preferably, functionalising a surface comprises contacting the said surface with $H_2O$, ammonia or an amine in liquid or gaseous form.

Generally, prior to performing a step of functionalising a surface of the solid-state membrane, the surface is cleaned. For instance, the surface may be cleaned with ozone, plasma or piranha solution.

Accordingly in a particularly preferred embodiment the process of the invention comprises a preliminary step of functionalising the first surface of the solid-state membrane, which preliminary step comprises cleaning the surface and contacting it with water to provide hydroxyl groups thereon. Cleaning the surface may comprise treating the surface with plasma or piranha solution.

In other embodiments, the process may comprise one or more preliminary steps which involve forming one or more recesses in the solid state membrane. Formation of a recess provides a region of the solid-state membrane with a suitable thickness for generating an aperture therein, for example by dielectric breakdown. Formation of one or more recesses typically occurs prior to functionalisation of the surface.

Formation of a recess can be achieved by any known means, depending on factors such as the composition of the solid-state membrane and the desired depth profile of the recess(es). Suitable methods of forming a recess in a solid-state membrane include etching processes (such as chemical etching or reactive ion etching).

Thus, in a preferred embodiment, the processes of the invention comprises an initial step of etching the solid state membrane to provide one or more recesses. For instance, the process may comprise initially etching the solid state membrane to provide a recess wherein the solid state membrane has an average thickness of from 1 to 100 nm, preferably from 2 to 30 nm, more preferably from 5 to 20 nm.

The initial step of generating one or more recesses is particularly useful where it is desired to generate a plurality of apertures. This is because generation of recesses will determine the position at which apertures may be formed within the solid-state membrane: apertures will form at the thinnest parts of the solid-state membrane (i.e. at the recesses).

Multiple Apertures

Multiple apertures may be generated by the process of the invention, or present in the substrates of the invention. Accordingly, in some embodiments, the process of the invention comprises
  providing a substrate which comprises a solid-state membrane and a chemical surface modification on a first surface of the solid-state membrane; and
  forming a plurality of apertures through the chemical surface modification and the solid-state membrane.

Where the substrate comprises multiple apertures, the distance (pitch) between the apertures may be 10 nm or more, optionally 50 nm or more, optionally 100 nm or more, optionally 1 micron or more, optionally 50 microns or more depending upon the application. The apertures may be provided in a regular array, for example a square or hexagonal packed array, or an irregular array.

Where the process of the invention is a process involving formation of multiple apertures, or the substrate of the invention comprises multiple apertures, each aperture may be formed sequentially or simultaneously. Preferably, the apertures are formed simultaneously, i.e. in parallel.

Preferably, where the process is a process of forming multiple apertures, the step of forming the apertures comprises a dielectric breakdown process. Accordingly, in an embodiment the process involves forming multiple apertures using dielectric breakdown. In a preferred aspect of this embodiment, the process involves forming multiple apertures in parallel using dielectric breakdown. In an embodiment, at least 10 apertures are formed in parallel, optionally at least 50, optionally at least 100, optionally at least 1000, optionally at least 10000, optionally at least 100000, optionally at least 1000000.

Where the process comprises generating multiple apertures, the apertures may be generated at the same surfaces of the solid-state membrane. By this is meant that the process may comprise:
  providing a substrate which comprises
    a solid-state membrane having a first surface and a second surface;
    a first chemical surface modification on the first surface of the solid state membrane; and
    optionally a second chemical surface modification on the second surface of the solid state membrane; and
  contacting the first chemical surface modification with a first ionic solution, and contacting a second surface of the solid-state membrane (or the second chemical surface modification thereon) with a second ionic solution; and applying a voltage across the solid-state membrane via first and second electrodes in respective contact with the first and second ionic solutions to form two or more apertures through the solid-state membrane and the first (and optionally the second) chemical surface modifications.

In other words, two or more apertures may be generated which extend from the first to the second surface of the solid-state membrane.

In other embodiments, the two or more apertures may be generated at different surfaces of the solid-state membrane. This can be achieved by generating two or more apertures separately. By this is meant that the process may comprise:
  providing a substrate which comprises
    a solid-state membrane having a first surface, a second surface, a third surface and a fourth surface;
    a first chemical surface modification on the first surface of the solid state membrane; and
    optionally a second chemical surface modification on the second surface of the solid state membrane, optionally a third chemical surface modification on the third surface of the solid state membrane and optionally a fourth chemical surface modification on the fourth surface of the solid state membrane, wherein each chemical surface modification present may be the same or different;
  contacting the first chemical surface modification with a first ionic solution, and contacting a second surface of the solid-state membrane (or the second chemical surface modification thereon) with a second ionic solution; and applying a voltage across the solid-state membrane via first and second electrodes in respective contact with the first and second ionic solutions to form one or more apertures through the the solid-state membrane joining first and second surfaces, and through the first (and optionally the second) chemical surface modifications; and
  contacting the third surface (or the third chemical surface modification thereon) with a third ionic solution, and contacting a fourth surface of the solid-state membrane (or the fourth chemical surface modification thereon) with a fourth ionic solution; and applying a voltage across the solid-state membrane via third and fourth electrodes in respective contact with the third and fourth ionic solutions to form one or more apertures through the solid-state membrane joining the third and fourth surfaces, and optionally through the third and fourth chemical surface modifications if present.

More preferably, however, the two or more apertures generated at different surfaces of the solid-state membrane may be generated as follows. The process of the invention may comprise providing a substrate which comprises
   a solid-state membrane having a first surface and a second surface;
   a first chemical surface modification on the first surface of the solid state membrane; and
   optionally a second chemical surface modification on the second surface of the solid state membrane, optionally a third chemical surface modification on the third surface of the solid state membrane and optionally a fourth chemical surface modification on the fourth surface of the solid state membrane, wherein each chemical surface modification present may be the same or different; and contacting the first chemical surface modification, and the third surface or the third chemical surface modification thereon, with a first ionic solution; and contacting the second surface and the fourth surface of the solid-state membrane (or the second and fourth chemical surface modifications thereon) with a second ionic solution; and applying a voltage across the solid-state membrane via first and second electrodes in respective contact with the first and second ionic solutions to form
   one or more apertures through the solid-state membrane and joining the first and second surfaces, and through the first chemical surface modification (and optionally the second chemical surface modification if present); and
   one or more apertures through the solid-state membrane joining the third and fourth surfaces, and optionally through the third and fourth chemical surface modifications if present.

Further chemical surface modifications are chemical surface modifications as described herein. Further ionic solutions are ionic solutions as described herein. Thus, where present, the third chemical surface modification, the fourth chemical surface modification, the third ionic solution and the fourth ionic solutions are as described herein in relation to a "chemical surface modification", or "ionic solution" respectively.

The latter process, where a continuous body of the first ionic solution is brought into contact simultaneously with a plurality of surfaces of the solid-state membrane (or chemical modifications thereon) allows a potential difference to be applied across all of surfaces simultaneously via the first and second electrodes. Dielectric breakdown and the formation of apertures occurs in parallel, thereby allowing a large number of apertures to be formed in the same amount of time as would be required for a single aperture. A large number of apertures can therefore be produced efficiently, and so this is a preferred method of generating a plurality of apertures.

As mentioned above, where it is desired to produce multiple apertures, it is preferably to initially generate a plurality of recesses in the solid-state membrane in order to direct the location at which the apertures will be formed. Generally, therefore, where the process is a process of generating a plurality of recesses in the solid-state membrane, the process comprises an initial step of generating a plurality of recesses in the solid state membrane. In an exemplary embodiment, the process of the invention is a process for producing a substrate comprising a plurality of apertures, the process comprising:
   etching a solid state membrane to provide a plurality of recesses, each recess typically being a portion of solid state membrane having a first surface and an average thickness of from 1 to 100 nm, preferably from 2 to 30 nm, more preferably from 5 to 20 nm;
   providing a chemical surface modification on the first surface of the solid-state membrane at each recess; and
   forming one or more apertures through the chemical surface modification and the solid-state membrane at each recess.

In another preferred embodiment, where the substrate comprises multiple apertures or where the process is a process for generating multiple apertures, a biomolecular pore is inserted in one or more of said apertures to generate a hybrid nanopore. The process steps by which a hybrid nanopore may be generated are as described herein.

Accordingly, in a preferred embodiment of the process of the invention, the process is a process for producing a substrate comprising a plurality of hybrid nanopores, which process comprises inserting a biomolecular pore into the one or more apertures. Usually, said process comprises inserting no more than one biomolecular pore into each of the one or more apertures.

Preferably, the or each hybrid nanopore further comprises a layer of amphipathic molecules, where the layer of amphipathic molecules is as described herein. A layer of amphipathic molecules forms a charge seal preventing charge leakage across the solid-state membrane, and can support the biomolecular pore. Thus, in a preferred embodiment of this aspect of the invention, the process is a process of generating a plurality of hybrid nanopores, the process comprising disposing a layer of amphipathic molecules across the one or more apertures and inserting a biomolecular pore into each layer of amphipathic molecules disposed across the one or more apertures.

Substrate Comprising an Aperture and a Layer of Amphipathic Molecules

The process described herein is capable of producing a substrate which can support a layer of amphipathic molecules over a small aperture. Thus, in one embodiment the invention provides a substrate comprising an aperture, wherein
   the substrate comprises a solid state membrane and a chemical surface modification on a first surface of the solid state membrane;
   the aperture is up to 50 nm in diameter; and
   a layer of amphipathic molecules is disposed across the aperture.

The substrate, solid state membrane, chemical surface modification and layer of amphipathic molecules are as described above.

The aperture is as described herein, with the caveat that the aperture is up to 50 nm in diameter. Thus, the aperture is typically about 0.1 nm up to 50 nm in diameter, for instance from about 1 nm to about 25 nm or about 1 nm to about 10 nm in diameter. In a preferred aspect, the aperture is about 5 nm in diameter or less.

Where the substrate comprising a layer of amphipathic molecules also comprises a biomolecular pore, the biomolecular pore is as described herein.

This substrate may be referred to herein as "the substrate comprising a layer of amphipathic molecules".

The process described herein can conveniently be used to generate a plurality of apertures, having a substantially uniform size, quickly and cheaply. Thus, in one embodiment the substrate comprising a layer of amphipathic molecules comprises a plurality of apertures. For instance, the substrate may comprise one or more further apertures each being up to 50 nm in diameter and having a layer of amphipathic molecules disposed across each aperture.

In a particularly preferred embodiment, the substrate comprising a layer of amphipathic molecules comprises a plurality of apertures and:
the solid state membrane comprises a plurality of recesses, each recess being a portion of solid state membrane having a first surface and an average thickness of from 1 to 100 nm, preferably from 2 to 30 nm, more preferably from 5 to 20 nm;
a chemical surface modification is present on the first surface of the solid-state membrane at each recess; and
the aperture or apertures are positioned at the recesses.

The substrate comprising a layer of amphipathic molecules may comprise more than one layer of amphipathic molecules. For instance, the substrate comprising a layer of amphipathic molecules may preferably comprise a lipid bilayer spanning the one or more apertures. A second chemical surface modification may be included to support a second or further layer of amphipathic molecules, or to otherwise modify the substrate to provide useful properties. Thus, the substrate comprising a layer of amphipathic molecules can comprise a chemical surface modification at a second surface or second surfaces of the solid state membrane. This may be referred to as the second chemical surface modification.

As described above, where a layer of amphipathic molecules is present it is generally in the form of a monolayer or a bilayer. Thus, in the substrate comprising a layer of amphipathic molecules, the (or each) layer of amphipathic molecules preferably comprises a bilayer of amphipathic molecules. Of course, the bilayer typically spans the aperture and be formed by first and second monolayers of amphipathic molecules disposed across the first and second chemical surface modifications respectively meeting at the aperture.

Preferably, in the substrate comprising a layer of amphipathic molecules, each aperture is provided with a layer of amphipathic molecules. Accordingly, typically a first layer of amphipathic molecules is disposed on the chemical surface modification on the or each first surface of the solid-state membrane and across the or each aperture.

Further preferably, a second layer of amphipathic molecules is disposed on a second surface or surfaces of the solid-state membrane, or on a chemical surface modification on the second surface or surfaces of the solid-state membrane, and across the or each aperture. The first and second layer may meet and form a bilayer, preferably a lipid bilayer.

In a preferred embodiment, the substrate comprising a layer of amphipathic molecules comprises a hybrid nanopore. Thus, it is preferred that the layer or layers of amphipathic molecules comprise a biomolecular pore.

The process of the invention is capable of forming exceptionally small pores, and moreover such small pores promote the stability of the layer of amphipathic molecules disposed across the solid-state membrane. Accordingly, it is preferred that the or each aperture in the substrate comprising a layer of amphipathic molecules has a diameter of from about 0.1 to about 10 nm, preferably from about 0.1 to about 5 nm.

Substrate Comprising a Small Aperture

The invention also provides a substrate comprising an aperture, wherein
the substrate comprises a solid state membrane and a chemical surface modification on a first surface of the solid state membrane; and
the aperture is less than 5 nm in diameter.

This embodiment of the invention may be referred to herein as "the substrate comprising a small aperture". The substrate, the solid-state membrane, and the chemical surface modification are as described herein.

The aperture is as described herein, with the caveat that the aperture must be less than 5 nm in diameter. Typically, the aperture is about 0.1 nm to about 4 nm in diameter, for instance from about 0.1 nm to about 3 nm in diameter, e.g. about 2 nm in diameter.

In some embodiments, the substrate comprising a small aperture comprises a plurality of apertures each less than 5 nm in diameter. Each aperture is typically about 0.1 nm to about 4 nm in diameter, for instance from about 0.1 nm to about 3 nm in diameter, e.g. about 2 nm in diameter.

Preferably, the aperture or apertures are less than 4.5 nm in diameter, preferably less than 4 nm in diameter. Also preferably, the aperture or apertures are at least 0.1 nm in diameter.

The solid-state membrane may comprise one or more recesses as described herein. The recesses direct the location (s) at which the small aperture(s) form. In some embodiments, the substrate comprising a small aperture comprises a plurality of apertures, and:
the solid state membrane comprises a plurality of recesses, each recess being a portion of solid state membrane having a first surface and an average thickness of from 1 to 100 nm, preferably from 2 to 30 nm, more preferably from 5 to 20 nm;
a chemical surface modification is present on the first surface of the solid-state membrane at each recess; and
the aperture or apertures are positioned at the recesses.

The substrate comprises a chemical surface modification at a first surface of the solid state membrane. As elsewhere, this may be referred to as a first chemical surface modification. Optionally, the substrate may also comprises a chemical surface modification at a second surface or second surfaces of the solid state membrane.

In some embodiments of the substrate comprising a small aperture, a layer of amphipathic molecules is disposed across the or each aperture. Where a layer of amphipathic molecules is present, the layer of amphipathic molecules disposed across the or each aperture comprises a bilayer of amphipathic molecules. The or each layer of amphipathic molecules spanning the or each aperture preferably comprises a lipid bilayer.

Each layer of amphipathic molecules is preferably supported on the solid-state membrane by a chemical surface modification. Thus, the first layer of amphipathic molecules is disposed on the chemical surface modification on the first surface or first surfaces of the solid-state membrane and across the or each aperture. A second layer of amphipathic molecules may also be present. For instance, the substrate comprising a small aperture may also comprise a second layer of amphipathic molecules is disposed on a second surface or second surfaces of the solid-state membrane, or on a chemical surface modification on the second surface of the solid-state membrane, and across the or each aperture.

In a preferred embodiment, the substrate comprising a small aperture comprises a hybrid nanopore. Thus, in some embodiments, the or each aperture of the substrate comprising a small aperture further comprises a biomolecular pore.

Applications of the Substrate

The substrate described herein can be used in a variety of applications where operations at the nanoscale are of importance. In particular, the substrates described herein and the substrates formed by the methods described herein may be used to sense a molecular entity by performing a measurement (e.g. an electrical measurement or an optical measurement) that is dependent on an interaction between the molecular entity and the aperture.

Thus, in an embodiment, the invention provides a sensor comprising a substrate as described herein. The sensor may also comprise a measurement system configured to sense a molecular entity in one or more of the apertures by performing a measurement that is dependent on an interaction between the molecular entity and the aperture.

Sensing of molecular entities can provide the basis for identifying single molecules and molecular entities. There are a wide range of possible applications, such as sequencing of DNA or other nucleic acids; sensing of chemical or biological molecules for security security and defence; detection of biological markers for diagnostics; ion channel screening for drug development; and label free analysis of interactions between biological molecules.

The molecular entity may be polymeric such as an amino acid, peptide, polypeptide, a protein or a polynucleotide. The polynucleotide may comprise any combination of any nucleotides. The nucleotides can be naturally occurring or artificial. One or more nucleotides in the polynucleotide can be oxidized or methylated. One or more nucleotides in in the polynucleotide may be damaged. For instance, the polynucleotide may comprise a pyrimidine dimer. Such dimers are typically associated with damage by ultraviolet light and are the primary cause of skin melanomas. One or more nucleotides in in the polynucleotide may be modified, for instance with a label or a tag. The polynucleotide can be a nucleic acid, such as deoxyribonucleic acid (DNA) or ribonucleic acid (RNA). The polynucleotide can comprise one strand of RNA hybridised to one strand of DNA. The molecular entity may comprise a single stranded or double stranded polynucleotide. The polynucleotide may be partially double stranded. The polynucleotide may be labelled with one or more of a fluorescent label, an optical label, a magnetic species or a chemical species, wherein detection of the species or label is indicative of the polynucleotide. Nucleic acid probes may be hybridised to the polynucleotide and resultant structure detected by translocation through an aperture such as disclosed in published application WO2007/041621. The polynucleotide may be labelled with one or more acceptor labels, which interact with one or more donor labels attached to an aperture of the array, such as disclosed by published application WO2011/040996. The polynucleotide may be any synthetic nucleic acid known in the art. The molecular entity may be an aptamer. The molecular entity is caused to translocate the aperture and the interactions between the molecular entity and the aperture are measured.

Translocation of the molecular entity through the aperture may be assisted by a motor protein such as a polynucleotide handling enzyme, or a polypeptide handling enzyme such as disclosed in published application WO2013/123379. Preferred enzymes are polymerases, exonucleases, helicases and topoisomerases, such as gyrases. Any helicase may be used in the invention. The helicase may be derived from a Hel308 helicase a RecD helicase, such as TraI helicase or a TrwC helicase, a XPD helicase or a Dda helicase. The helicase may be any of the helicases, modified helicases or helicase constructs disclosed in International Application Nos. PCT/GB2012/052579 published as WO 2013/057495); PCT/GB2012//053274 (published as WO 2013/098562); PCT/GB2012/053273 (published as WO 2013/098561). Alternatively translocation of the entity through the pore may also be assisted by voltage control, such as disclosed by International Patent Application PCT/US2008/004467.

The characteristic to be determined may be a sequence characteristic of the polymer.

The measurement may for example be electrical, optical or both. The electrical measurement may comprise measurement of ion flow through the aperture(s) under a potential difference or concentration gradient. Electrical measurements may be made using standard single channel recording equipment as described in Stoddart D et al., Proc Natl Acad Sci, 12; 106(19):7702-7, Lieberman K R et al., J Am Chem Soc. 2010; 132(50):17961-72, and and International Application WO 2000/28312. Alternatively, electrical measurements may be made using a multi-channel system, for example as described in International Application WO 2009/077734 and International Application WO 2011/067559. Optical measurements may be combined with electrical measurements (Soni G V et al, Rev Sci Instrum. 2010 January; 81(1):014301).

The sensor may comprise a measurement system arranged as disclosed in any of WO-2008/102210, WO-2009/07734, WO-2010/122293, WO-2011/067559 or WO2014/04443. The sensor may comprise electrodes arranged on each side of the membrane in order to measure an ion current through an aperture under a potential difference. The electrodes may be connected to an electrical circuit which includes a control circuit arranged to supply a voltage to the electrodes and a measurement circuit, arranged to measure the ion flow. A common electrode may be provided to measure ion flow through the aperture(s) between the common electrode and electrodes provided on the opposite side of the membrane.

Fluid chambers provided on either side of the substrate may be referred to as the cis and trans chambers. The molecular entity to be determined by the aperture(s) is typically added to the cis chamber comprising the common electrode. Separate trans chambers may be provided on the opposite side of the substrate, each trans chamber comprising an electrode wherein ion flow through each aperture is measured between an electrode of the trans chamber and the common electrode.

Determination of sequence information or molecular sequence classification may be carried out using an artificial neural network (ANN).

Any measurement system used may be linked to or comprise a processor such as an ASIC, FPGA, or computer. Analysis of the measurements may be carried out in the sensor, alternatively it may be done remotely, such as by a cloud based system.

Suitable conditions for measuring ionic currents through apertures are known in the art. The method is typically carried out with a voltage applied across the membrane and aperture. The voltage used is typically from +5 V to −5 V, such as from +4 V to −4 V, +3 V to −3 V or +2 V to −2 V. The voltage used is typically from −600 mV to +600 mV or −400 mV to +400 mV. The voltage used is preferably in a range having a lower limit selected from −400 mV, −300 mV, −200 mV, −150 mV, −100 mV, −50 mV, −20 mV and 0 mV and an upper limit independently selected from +10 mV, +20 mV, +50 mV, +100 mV, +150 mV, +200 mV, +300 mV and +400 mV. The voltage used is more preferably in the range 100 mV to 2V. It is possible to increase discrimination between different nucleotides by an aperture by using an increased applied potential. As an alternative to measurement of an ionic current, measurement of a conductance or resistance may be carried out.

Alternative or additional measurements associated with movement of the molecular entity with respect to the aperture may be carried out, such as measurement of a tunnelling current across the aperture (Ivanov A P et ah, Nano Lett. 2011 Jan. 12; 11(1):279-85), or a field effect transistor (FET) device, such as disclosed by WO 2005/124888, U.S. Pat. No. 8,828,138, WO 2009/035647, or Xie et al, Nat Nanotechnol. 2011 Dec. 11; 7(2): 119-125. The measurement device may be an FET nanopore device comprising source and drain electrodes to determine the presence or passage of a molecular entity in the apertures. An advantage of employing an FET nanopore device, namely one employing FET measurements across the apertures, or one employing measurement of a tunnelling current across the aperture, is that the measurement signal is very local to a particular aperture and therefore a device comprising a shared trans chamber may be employed. This greatly simplifies the construction of the device without the need to provide separate trans chambers for each aperture, such as one for the measurement of ion flow through the apertures, as described above. As a result, very high densities of apertures in the substrate may be conveniently provided.

Sensing methods, particularly those involving measurement of an ionic current, may be performed in a sensing solution comprising various different charge carriers, including for example metal salts, for example alkali metal salt, halide salts, for example chloride salts, such as alkali metal chloride salt. Charge carriers may include ionic liquids or organic salts, for example tetramethyl ammonium chloride, trimethylphenyl ammonium chloride, phenyltrimethyl ammonium chloride, or 1-ethyl-3-methyl imidazolium chloride. Potassium chloride (KCl), sodium chloride (NaCl), caesium chloride (CsCl) or a mixture of potassium ferrocyanide and potassium ferricyanide is typically used. KCl, NaCl and a mixture of potassium ferrocyanide and potassium ferricyanide are preferred. The charge carriers may be asymmetric across the solid-state membrane. For instance, the type and/or concentration of the charge carriers may be different on each side of the membrane.

The salt concentration may be at saturation. The salt concentration may be 3 M or lower and is typically from 0.1 to 2.5 M. High salt concentrations provide a high signal to noise ratio and allow for currents indicative of the presence of a nucleotide to be identified against the background of normal current fluctuations.

The sensing solution may comprise a buffer. Any buffer may be used. Typically, the buffer is phosphate buffer. The sensing solution may comprise a buffer to regulate the pH. Any buffer suitable for the desired pH may be used. Maintaining a particular pH may be desirable for a variety of reasons, including maintaining consistent motor protein and biological nanopore performance, maintaining a consistent surface charge on solid-state membranes, and maintaining a consistent charge (and thus a consistent driving force and capture rate) on target analytes such as DNA.

Either or both of the first and second ionic solutions used for forming the apertures may also be used as the sensing solution. A sensing solution is a solution comprising an analyte. Either or both of the first and second ionic solutions may comprise an analyte. An analyte may be derived from or contained in a biological fluid containing ions (e.g. from salt), such as blood or plasma. An analyte may comprise one or more chemicals of interest, such as a target polymer, for example a polynucleotide or a polypeptide.

Thus, the invention provides a method of characterising a target polymer using the sensor described herein, the method comprising
    contacting the sensor with the target polymer, such that the target polymer moves with respect to the aperture or one of the apertures in the substrate; and
    taking one or more measurements as the target polymer moves with respect to, for example into or through, the aperture and thereby characterising the polymer; optionally wherein the method comprises measuring the current passing through the aperture as the polymer moves with respect to the aperture.

Preferably, contacting the sensor with the target polymer comprises contacting the sensor with an ionic solution comprising the target polymer. The ionic solution comprising the polymer is the sensing solution mentioned above.

Apparatus

The invention also provides an apparatus comprising a substrate, wherein the substrate is as described herein.

In addition to the substrate, the apparatus of the invention may comprise an analyte.

The apparatus may comprise a port for delivery of a substance (e.g. a fluid comprising an analyte) to the substrate. Preferably, the apparatus of the invention may comprise a port for delivery of an analyte. The analyte is as described herein and may comprise a target polymer. Thus, the apparatus of the invention may comprise a port for delivery of a target polymer.

The apparatus may further comprise a fluid chamber suitable for containing an analyte. The apparatus may further comprise a port for removal of waste substances such as waste fluids. The apparatus may further comprise one or more reagents.

In the apparatus according to the invention, the substrate may comprise a plurality of apertures. The substrate comprises at least one aperture as described herein, and each further aperture in the plurality of apertures may also be as described herein. Thus, where the substrate comprises a plurality of apertures:
    one or more of the apertures is obtained or obtainable by a process as described herein; and/or
    one or more of the apertures has a diameter of less than 5 nm; and/or
    one or more of the apertures has a diameter of up to 50 nm and has a layer of amphipathic molecules disposed across it.

In a preferred embodiment, the substrate comprises a plurality of apertures which are provided in an array. The apertures within the plurality of apertures may be provided in a regular array, for example a square or hexagonal packed array, or an irregular array.

In a particularly preferred embodiment, the apparatus comprises a substrate as described herein, wherein:
    the substrate comprises a solid state membrane and a chemical surface modification on a first surface of the solid state membrane;
    the substrate comprises a plurality of apertures each being up to 50 nm in diameter and having a layer of amphipathic molecules disposed across each aperture; and
    the plurality of apertures are provided in an array.

In one embodiment, the apparatus comprises a sensor as described herein. For instance, the apparatus of the invention may comprise a substrate of the invention together with one or more of the following.

A motor protein.
A system for making electrical measurements as described herein, for instance standard single channel recording equipment or a multi-channel system.
A system for making optical measurements as described herein.
A measurement system as described herein.
One or more fluid chambers, for instance a cis chamber and/or a trans chamber.
A sensing solution.
A buffer.
A system for analysing measurements, such as a computer or a neural network.

EXAMPLES

Example 1: Protein Pore Inserted into Dielectric Breakdown Aperture in FET Channel with OTS Modification An FET chip was fabricated on a membrane comprising a 70 nm thick wafer of Si and a 40 nm thick wafer of $SiN_x$. A recess approximately 100 nm wide was etched by reactive ion etching (RIE) to a depth of approximately 95-100 nm, completely removing the Si portion in the region of the recess and leaving a 10-15 nm thick layer of $SiN_x$.

Figure 6:
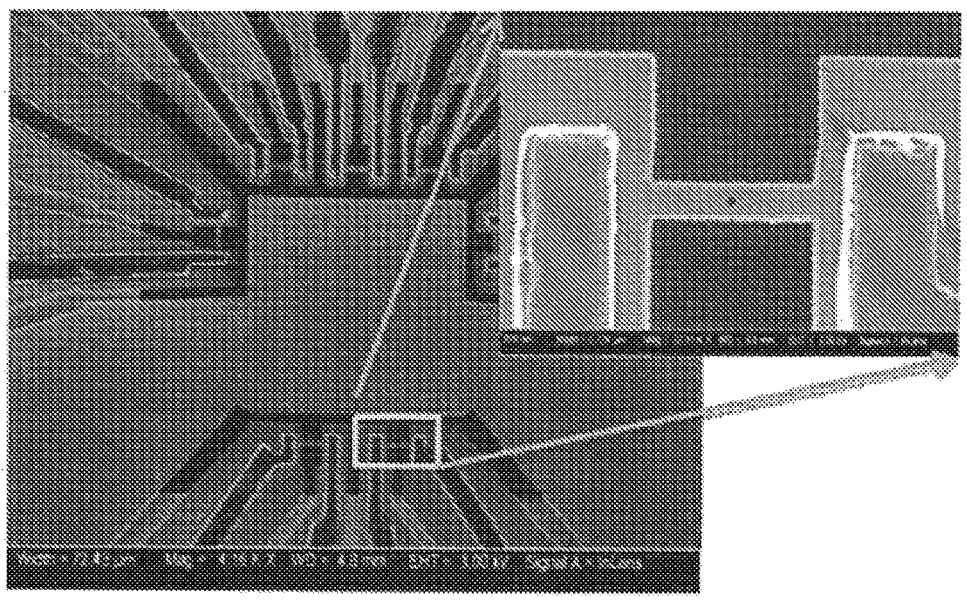
FIG. 6 is an image of a FET chip made of a solid-state membrane. The insert shows a single FET from this chip at higher magnification, showing the recess formed to generate a thin portion of solid-state membrane.

The structure of the chip is shown in FIG. 6 (larger image). There are 7 FETs on one chip, and four of these have a recess etched therein with a diameter of approximately 100 nm. A zoomed-in view of a single FET (field-effect transistor) having a 100 nm recess etched therein is shown in the inset of FIG. 6.

After fabrication, the surface was cleaned by oxygen plasma and UV-ozone stripper. The chip was then dipped in deionised water and dried, which provides terminal —OH groups on the surface of the solid-state membrane ($SiN_x$). The chip surface was then reacted with n-octadecyltrichlorosilane (OTS) in either the gas phase or in anhydrous toluene solution. This formed a monolayer of n-octadecyltrichlorosilane derivatives on the surface of the solid-state membrane. The OTS derivatives are attached to the —OH groups via the silicon atom, and so the alkyl chain moieties of the OTS molecules are therefore exposed. The resulting monolayer, or chemical surface modification, consequently mimics the hydrophobic side of a lipid monolayer, as the alkyl chains mimic the tails of lipids.

Figure 7:
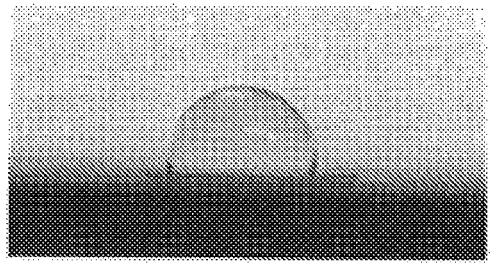
FIG. 7 shows a water droplet disposed on a solid-state membrane carrying a hydrophobic chemical surface modification.

The resulting surface of the solid-state membrane is very hydrophobic with contact angle around 100° or even larger. This can be seen when a water droplet is placed on the surface, as shown in FIG. 7; the water droplet minimises its area of contact with the surface and bulges out over its base.

The chip was then assembled into a measurement cell such that the chip was the only thing separating two solution chambers. The lipid DPhPC, or the lipid TBCP, was added to both sides of the chamber and a lipid monolayer was established on each of the two surfaces of the $SiN_x$ membrane facing the solution chambers. The lipid monolayer was established by the Montal-Mueller method.

Thus, a system was established where a first surface and a second surface of the solid-state membrane, each having a chemical surface modification (a monolayer of molecules derived from OTS) thereon, and each chemical surface modification having a lipid monolayer thereon. The first chemical surface modification contacted a first ionic solution (via the lipid monolayer), and the second chemical surface modification contacted a second ionic solution (also via a lipid monolayer). However, because there was no aperture through the solid-state membrane, no current flowed between the two solution chambers at this point.

A first voltage of 10 V was applied in 100 ms pulses across the membrane with the FET disconnected ("floating") until a stable leakage current was detected across the membrane to initiate formation of the aperture. Then a continuous voltage of 5 to 9 V was applied across the membrane to enlarge the aperture, and the leakage current was monitored until a stable leakage current of ~5 nA at 500 mV was established. It was calculated from the thickness of the $SiN_x$ membrane and the conductance of the first and second ionic solutions that the diameter of the aperture formed by this dielectric breakdown was less than 5 nm.

After formation of the aperture, the Montal-Mueller method was used to form a charge seal (also called a giga-seal) again. Thus, a lipid bilayer of DPhPC or TBCP was disposed across the aperture. Hemolysin (HL) was added to one of the first or second ionic solutions and was inserted into the aperture. This was achieved by repetitively rupturing the lipid bilayer, by applying a high voltage across the solid-state membrane and the lipid bilayer (typically 300 mV). The lipid bilayer was then allowed to form again in the presence of a lower voltage (300 mV or even 0 V). Eventually, the lipid bilayer re-forms with hemolysin present.

Figure 8:
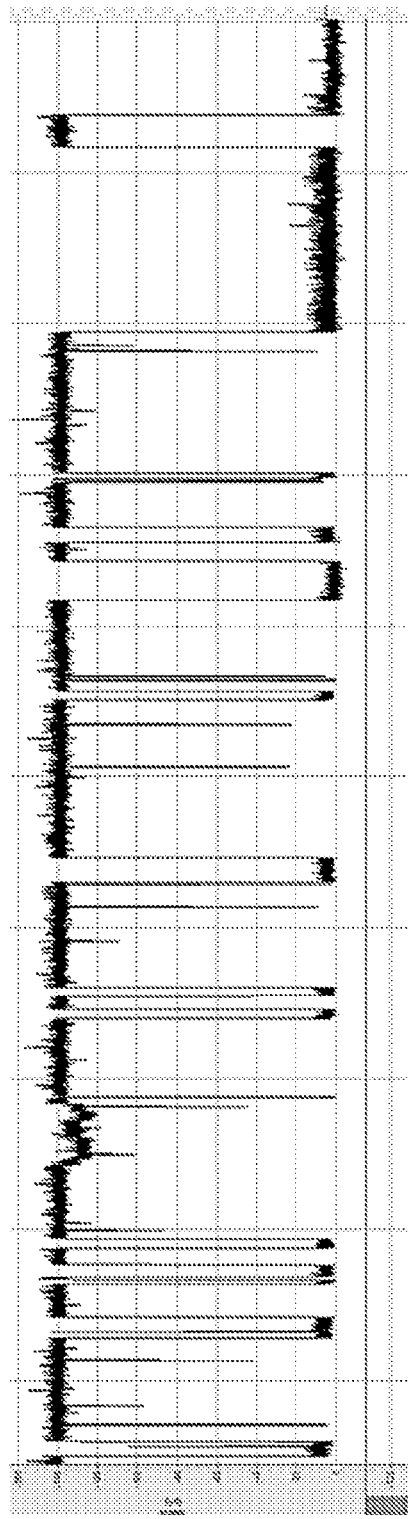
FIG. 8 shows a TBA translocation signal recorded across a hybrid nanopore as described herein comprising a hemolysin protein pore, as single-strand DNA (ssDNA) translocates through the protein pore.

After HL insertion, DNA was injected into the first or second ionic solution. ssDNA translocation events were observed. FIG. 8 shows a TBA translocation signal recorded across a hybrid pore generated as described above. Variations in current can be seen as ssDNA interacts with the hemolysin pore.

Because the size of the solid-state pore is so small, only one biomolecular pore (HL) inserts into the aperture. Presumably this is due to a steric exclusion effect; the aperture is sufficiently small that one only one HL protein pore can fit in it. Accordingly, the signal generated and shown in FIG. 8 does not suffer from complications due to simultaneous translocation events through multiple pores.

Example 2: Silanization of Very Small Solid-State Nanopore by 3-Aminopropyltrimethoxysilane A pre-patterned chip similar to that discussed in Example 1 and shown in FIG. 6 was fabricated and cleaned. The chip was then assembled into the measurement cell, and each solution chamber was filled with 3-aminopropyltrimethoxysilane in 0.5M TBACl in anhydrous MeOH.

The chemical surface modification precursor 3-aminopropyltrimethoxysilane immediately formed a chemical surface modification on the cleaned surface of the solid-state membrane (10-15 nm thick $SiN_x$).

A voltage of 10 V was applied in 100 msec pulses applied cross the solid-state membrane (10-15 nm thick $SiN_x$) to initiate aperture generation, until a noticeable stable leakage current was detected. Then a voltage of 5-9 V was continuously applied and the leakage current was monitored until the stable leakage current reached the desired value (e.g. −1 nA at 500 mV). Clogging or partial clogging of the aperture could happen at the very early stage of aperture opening, but the aperture eventually stabilized with a modified inner surface. Thus, as the aperture was generated, the chemical surface modification precursor β-aminopropyltrimethoxysilane) immediately reacted with the freshly-generated internal wall of the aperture and formed a chemical surface modification (i.e. a coating of aminosilane) thereon. Thus, an aperture coated by aminosilane and having a diameter of less than 5 nm was generated.

The invention claimed is:

1. A process for producing a substrate comprising an aperture, which process comprises:
   providing a substrate which comprises a solid-state membrane and a chemical surface modification on a first surface of the solid-state membrane; and
   forming an aperture through the chemical surface modification and the solid-state membrane;
   wherein the chemical surface modification on a first surface of the solid-state membrane contacts a first ionic solution and a second surface of the solid-state membrane, or a chemical surface modification on the second surface of the solid-state membrane, contacts a second ionic solution; and
   wherein the first ionic solution and/or the second ionic solution comprises a chemical surface modification precursor.

2. The process according to claim 1, wherein the chemical surface modification comprises a layer which modifies a surface characteristic of the first surface of the solid-state membrane; optionally wherein the said surface characteristic is selected from one or more of hydrophobicity, chemical reactivity, chemical specificity and surface charge.

3. The process according to claim 1, wherein the chemical surface modification comprises a plurality of molecules.

4. The process according to claim 3, wherein the plurality of molecules are arranged in a monolayer on the first surface of the solid-state membrane; optionally wherein the monolayer is a self-assembled monolayer.

5. The process according to claim 3, wherein the said molecules are organic molecules.

6. The process according to claim 3, wherein the said molecules comprise a hydrophobic moiety.

7. The process according to claim 3, wherein the said molecules comprise an optionally substituted alkyl or alkenyl moiety.

8. The process according to claim 3, wherein the said molecules are derivatives of organosilane molecules.

9. The process according to claim 1, wherein the solid-state membrane comprises a dielectric material.

10. The process according to claim 1, wherein the solid-state membrane comprises a nitride and/or oxide of silicon and/or aluminium; optionally wherein the solid-state membrane comprises a compound of formula $SiN_x$, wherein x is from 1 to 2.

11. The process according to claim 1, wherein the aperture has a diameter of from 0.1 to 10 nm.

12. The process according to claim 1, wherein the step of forming an aperture through the chemical surface modification and the solid-state membrane comprises causing dielectric breakdown of the solid-state membrane.

13. The process according to claim 12, wherein the step of forming an aperture comprises contacting a first electrode with a first ionic solution in contact with the chemical surface modification on the first surface of the solid state membrane, and contacting a second electrode with a second ionic solution in contact with a second surface of the solid state membrane or a chemical surface modification thereon, and applying a first voltage across the solid state membrane.

14. The process according to claim 1, wherein the chemical surface modification precursor comprises an organic molecule; optionally wherein the chemical surface modification precursor comprises an optionally substituted alkyl or alkenyl moiety.

15. The process according to claim 1, wherein the chemical surface modification precursor comprises a hydrophobic moiety.

16. The process according to claim 1, wherein the chemical surface modification precursor is an organosilane.

17. A process for producing a substrate comprising an aperture, which process comprises:
   providing a substrate which comprises a solid-state membrane and a chemical surface modification on a first surface of the solid-state membrane; and
   forming an aperture through the chemical surface modification and the solid-state membrane;
   wherein the process comprises disposing a layer of amphipathic molecules across the aperture; optionally wherein the layer of amphipathic molecules disposed across the aperture comprises a bilayer of amphipathic molecules.

18. A process for producing a substrate comprising an aperture, which process comprises:
   providing a substrate which comprises a solid-state membrane and a chemical surface modification on a first surface of the solid-state membrane; and
   forming an aperture through the chemical surface modification and the solid-state membrane;
   wherein the process comprises inserting a biomolecular pore into the aperture; optionally wherein the biomolecular pore comprises a protein nanopore.

19. A process for producing a substrate comprising an aperture, which process comprises:
   providing a substrate which comprises a solid-state membrane and a chemical surface modification on a first surface of the solid-state membrane; and
   forming an aperture through the chemical surface modification and the solid-state membrane;
   wherein the process comprises forming the chemical surface modification on the first surface of the solid state membrane, comprising contacting the first surface of the solid state membrane with a first ionic solution comprising a chemical surface modification precursor.

20. The process according to claim 19, which comprises functionalizing the first surface of the solid state membrane prior to contacting the first surface of the solid state membrane with the first ionic solution comprising a chemical surface modification precursor.

21. A process for producing a substrate comprising an aperture, which process comprises:
   providing a substrate which comprises a solid-state membrane and a chemical surface modification on a first surface of the solid-state membrane; and
   forming an aperture through the chemical surface modification and the solid-state membrane;
   wherein the process is a process for producing a substrate comprising a plurality of apertures, which process comprises:
   providing a substrate which comprises a solid-state membrane and a chemical surface modification on a first surface of the solid-state membrane; and
   forming a plurality of apertures through the chemical surface modification and the solid-state membrane;
   wherein the process is a process for producing a substrate comprising a plurality of hybrid nanopores, which process comprises inserting a biomolecular pore into the one or more apertures.

* * * * *